(12) United States Patent
Takahashi

(10) Patent No.: US 11,084,247 B2
(45) Date of Patent: Aug. 10, 2021

(54) RESIN MOLDED SHEET AND PRODUCTION METHOD OF RESIN MOLDED SHEET, AND SHAPED ARTICLE AND PRODUCTION METHOD OF SHAPED ARTICLE

(71) Applicant: CASIO COMPUTER CO., LTD., Tokyo (JP)

(72) Inventor: Hideki Takahashi, Ome (JP)

(73) Assignee: CASIO COMPUTER CO., LTD., Tokyo (JP)

(\*) Notice: Subject to any disclaimer, the term of this patent is extended or adjusted under 35 U.S.C. 154(b) by 64 days.

(21) Appl. No.: 16/530,146

(22) Filed: Aug. 2, 2019

(65) Prior Publication Data

US 2020/0047459 A1 Feb. 13, 2020

(30) Foreign Application Priority Data

Aug. 10, 2018 (JP) .............................. JP2018-151770

(51) Int. Cl.
| | | |
|---|---|---|
| *B32B 3/00* | (2006.01) | |
| *B32B 7/027* | (2019.01) | |
| *B32B 27/08* | (2006.01) | |
| *B32B 5/18* | (2006.01) | |
| *B32B 27/06* | (2006.01) | |
| *B32B 27/36* | (2006.01) | |
| *B29C 35/08* | (2006.01) | |
| *B29K 67/00* | (2006.01) | |

(52) U.S. Cl.
CPC .......... *B32B 7/027* (2019.01); *B29C 35/0805* (2013.01); *B32B 5/18* (2013.01); *B32B 27/065* (2013.01); *B32B 27/08* (2013.01); *B32B 27/36* (2013.01); *B29C 2035/0822* (2013.01); *B29K 2067/003* (2013.01); *B32B 2250/24* (2013.01)

(58) Field of Classification Search
CPC ....... B29C 44/022; B29C 44/12; B29C 44/16; B32B 3/28; B32B 3/30; B32B 5/18; B32B 5/20; B32B 7/027; B32B 27/065; B41M 5/26; B41M 5/46
USPC ...................................... 428/32.64, 172, 187
See application file for complete search history.

(56) References Cited

FOREIGN PATENT DOCUMENTS

| | | |
|---|---|---|
| JP | S6287826 U | 6/1987 |
| JP | H02179789 A | 7/1990 |
| JP | H06008254 A | 1/1994 |

(Continued)

OTHER PUBLICATIONS

JP 2010-076132 Machine Translation (Year: 2010).\*

(Continued)

*Primary Examiner* — Zachary M Davis
(74) *Attorney, Agent, or Firm* — Holtz, Holtz & Volek PC

(57) ABSTRACT

A resin molded sheet includes: a base material made of resin; a first thermal expansion layer including a thermally expandable material and provided on a first surface of the base material; and a second thermal expansion layer including a thermally expandable material and provided on a second surface of the base material, wherein the first thermal expansion layer is provided at least on a first region, where the base material is deformed by the first thermal expansion layer, on the first surface of the base material, and the second thermal expansion layer is provided at least in a second region, where the base material is deformed by the second thermal expansion layer, on the second surface of the base material.

18 Claims, 10 Drawing Sheets

(56) References Cited

FOREIGN PATENT DOCUMENTS

| JP | H07246767 A | | 9/1995 |
|----|-------------|---|--------|
| JP | H10151870 A | * | 6/1998 |
| JP | 2001232734 A | | 8/2001 |
| JP | 2007199630 A | | 8/2007 |
| JP | 2010076132 A | * | 4/2010 |
| JP | 2016179679 A | | 10/2016 |

OTHER PUBLICATIONS

JP H10-151870 Machine Translation (Year: 1998).*
Chinese Office Action (and English language translation thereof) dated Apr. 12, 2021 issued in Chinese Application No. 201910729314.8.

* cited by examiner

RESIN MOLDED SHEET AND PRODUCTION METHOD OF RESIN MOLDED SHEET, AND SHAPED ARTICLE AND PRODUCTION METHOD OF SHAPED ARTICLE

FIELD

The present invention relates to a resin molded sheet using a thermal expansion layer containing a thermally expandable material that expands according to the amount of heat absorbed and a production method of the resin molded sheet, and relates to a shaped article using the resin molded sheet and a production method of the shaped article.

BACKGROUND

Conventionally, a switch such as a membrane switch is used as an input unit such as a numeral of an electronic device. In the membrane switch, for example, an embossed resin sheet is used. Further, in the embossing process, molding is performed to form a desired shape using a concave mold and a convex mold (for example, JP 6-8254 A).

In such a method, prior to forming a resin sheet, it is necessary to prepare a mold according to a shape to be processed. For this reason, the method has a problem that the cost and time for producing a metal mold are needed.

In particular, at the production stage of a prototype, processing a mold increases a time required for development, and therefore, it is required to easily form a resin sheet without requiring a mold.

The present invention has been made in view of the above situation, and provides a resin molded sheet capable of being easily molded and a production method of the resin molded sheet, and a shaped article using the resin molded sheet and a production method of the shaped article.

SUMMARY

A resin molded sheet includes: a base material made of resin; a first thermal expansion layer including a thermally expandable material and provided on a first surface of the base material; and a second thermal expansion layer including a thermally expandable material and provided on a second surface of the base material, wherein the first thermal expansion layer is provided at least on a first region, where the base material is deformed by the first thermal expansion layer, on the first surface of the base material, and the second thermal expansion layer is provided at least in a second region, where the base material is deformed by the second thermal expansion layer, on the second surface of the base material.

A production method of a resin molded sheet, includes the steps of: forming a first thermal expansion layer containing a thermally expandable material on a first surface of a base material made of resin; and forming a second thermal expansion layer containing a thermally expandable material on a second surface of the base material; wherein, in the forming a first thermal expansion layer, at least the first thermal expansion layer is formed in a first region, where the base material is deformed by the first thermal expansion layer, on the first surface of the base material, and in the forming a second thermal expansion layer, at least the second thermal expansion layer is formed in a second region, where the base material is deformed by the second thermal expansion layer, on the second surface of the base material.

A shaped article, includes: a base material made of resin; a first thermal expansion layer containing a thermally expandable material, and provided on a first surface of the base material; a second thermal expansion layer containing a thermally expandable material, and provided on a second surface of the base material; a first heat conversion layer provided on the first thermal expansion layer, that is, in a first region where the base material is deformed using the first thermal expansion layer, and the first heat conversion layer containing an electromagnetic wave heat conversion material that converts electromagnetic waves into heat; and a second heat conversion layer provided on the second thermal expansion layer, that is, in a second region where the base material is deformed using the second thermal expansion layer, and the second heat conversion layer containing an electromagnetic wave heat conversion material that converts electromagnetic waves into heat, wherein, in the first region, the first thermal expansion layer is raised due to expansion, and the base material is deformed following the first thermal expansion layer, and in the second region, the second thermal expansion layer is raised due to expansion, and the base material is deformed following the second thermal expansion layer.

A production method of a shaped article, using a resin molded sheet provided with a base material made of resin, a first thermal expansion layer containing a thermally expandable material and provided on a first surface of the base material, and the second thermal expansion layer containing a thermally expandable material and provided on a second surface of the base material, includes the steps of: forming a first heat conversion layer for converting electromagnetic waves into heat on the first thermal expansion layer, that is, on a first region where the base material is deformed using the first thermal expansion layer; forming a second heat conversion layer for converting electromagnetic waves into heat on the second thermal expansion layer, that is, on a second region where the base material is deformed using the second thermal expansion layer, irradiating the first heat conversion layer with electromagnetic waves to expand the first thermal expansion layer and deform the base material in the first region; and irradiating the second heat conversion layer with electromagnetic waves to expand the second thermal expansion layer and deform the base material in the second region.

DETAILED DESCRIPTION

Hereinafter, a resin molded sheet according to embodiments of the present invention, a production method of the resin molded sheet, a shaped article, and a production method of the shaped article will be described in detail with reference to the drawings.

In the present specification, the "shaped article" refers to a resin molded sheet in which simple shapes such as convex portions and concave portions, geometric shapes, characters, patterns, decorations, etc. are molded (formed) on a predetermined surface. Here, the "ornament" refers to the sense of beauty through visual and/or tactile sense. "Molding (or shaping)" means creating something having a shape and also includes concepts such as decoration that adds decoration, and decoration that forms decoration. Furthermore, although the shaped article of the present embodiment is a three-dimensional object which has unevenness, geometric shape, decoration, etc. in a predetermined surface, in order to distinguish from a three-dimensional object produced by a so-called three-dimensional printer, the shaped article of the present embodiment is also referred to as 2.5 dimensional (2.5D) objects or pseudo three-dimensional (pseudo-3D) objects. The technology for producing the shaped article of the present embodiment can also be referred to as 2.5D printing technology or pseudo-3D printing technology.

Further, in the present specification, for convenience of explanation, in the resin molded sheet, a surface provided with a thermal expansion layer is referred to as a front side (front surface) or an upper surface, and a base material side is referred to as a back side (back surface) or a lower surface. Here, the terms "front", "back", "upper" or "lower" do not limit the usage of the resin molded sheet, and depending on the usage of the resin molded sheet after molding, the back surface of the resin molded sheet may be used as a front. The same applies to shaped articles.

First Embodiment (Resin Molded Sheet 10)

Figure 1:
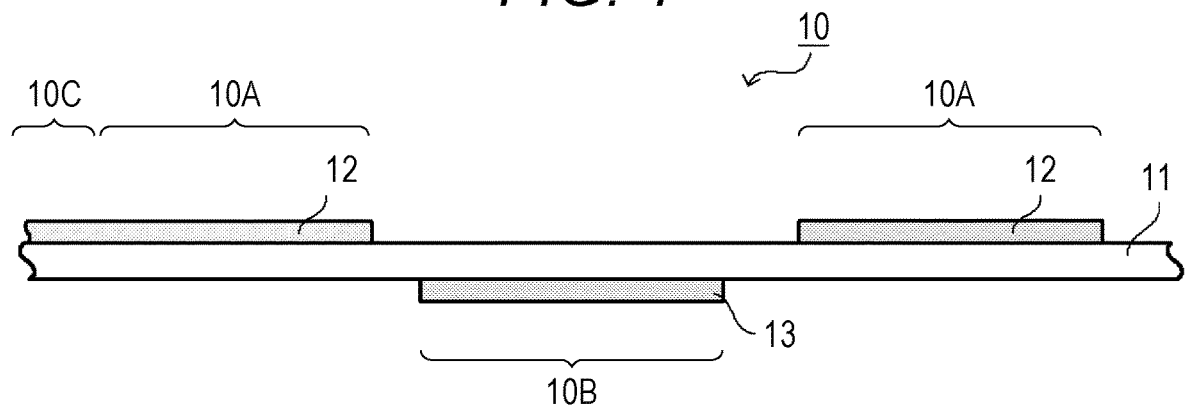
FIG. 1 is a cross-sectional view illustrating an outline of a resin molded sheet according to a first embodiment.

As illustrated in FIG. 1, a resin molded sheet 10 includes a base material 11, a first thermal expansion layer 12 provided on a first surface (an upper surface illustrated in FIG. 1) of the base material 11, and a second thermal expansion layer 13 provided on a second surface (a surface facing the first surface, a lower surface illustrated in FIG. 1) of the base material 11. As described later in detail, in the resin molded sheet 10, the base material 11 is deformed using the expansion force of the first thermal expansion layer 12 and the second thermal expansion layer 13, and the base material 11 maintains the shape after deformation. Thereby, the base material 11 of the resin molded sheet 10 is molded in a desired shape, and a shaped article 41 is produced.

The base material 11 supports the first thermal expansion layer 12 and the second thermal expansion layer 13. The base material 11 is a sheet-like member and made of resin. The resin is, for example, thermoplastic resins, but not limited thereto, and examples of the resin include polyolefin resins such as, polyethylene (PE) or polypropylene (PP), polyethylene terephthalate (PET), polyethylene naphthalate (PEN), polybutylene terephthalate (PBT), polyester resins, polyamide resins such as nylon, polyvinyl chloride (PVC) resins, polystyrene (PS), polyimide resins and the like. Furthermore, as the base material 11, a non-stretched PET film or the like is suitably used so as to be deformed easily. The thickness of the base material 11 is, for example, 100 to 500 μm. Further, in the case where the steps of expanding the first thermal expansion layer 12 and the second thermal expansion layer 13 is simultaneously performed as described later, it is preferable that the base material 11 be transparent.

Further, since the base material 11 is required to be easily deformed by heat, the material used as the base material 11, the thickness of the base material 11, and the like are determined so as to be easily deformed by heat. In addition, since the base material 11 needs to maintain the shape after deformation, the material used as the base material 11, the thickness of the base material 11, and the like are determined so as to be able to maintain the shape after deformation. Furthermore, the base material 11 is designed in the material, thickness, etc. which are suitable according to the use of the shaped article 41 after processing. For example, depending on the application of the shaped article 41, in addition to maintaining the shape after deformation, it is required to have an elastic force that can be restored to the original shape after being deformed by pressing. In such a case, the material of the base material 11 is determined such that the base material 11 after deformation has the required elastic force.

The first thermal expansion layer 12 is provided on the first surface (upper surface in FIG. 1) of the base material 11. The first thermal expansion layer 12 is a layer which expands to a size corresponding to the degree of heating (for example, heating temperature, heating time), and a thermally expandable material (thermally expandable microcapsule, micropowder) is dispersed in a binder. Now that, the first thermal expansion layer 12 is not limited to having one layer, and may have a plurality of layers. As a binder of the first thermal expansion layer 12, any thermoplastic resin such as ethylene vinyl acetate polymer, acrylic polymer and the like is used. In addition, thermally expandable microcapsules contain propane, butane and other low boiling point volatile substances in a shell of a thermoplastic resin. The shell is formed of, for example, a thermoplastic resin such as polystyrene, polyvinyl chloride, polyvinylidene chloride, polyvinyl acetate, polyacrylic ester, polyacrylonitrile, polybutadiene, or a copolymer thereof. For example, the average particle size of the thermally expandable microcapsules is about 5 to 50 μm. When the microcapsules are heated to a thermal expansion start temperature or more, the shell made of resin is softened, the low boiling point volatile substance contained therein is vaporized, and the shell expands like a balloon by the pressure. Depending on the properties of the microcapsules used, the particle size of the microcapsules expands to about five times the particle size before expansion. The particle sizes of the microcapsules vary, and not all microcapsules have the same particle size.

Further, in the present embodiment, as described later in detail, the first thermal expansion layer 12 is used to form the first convex portion 11a on the first surface of the base material 11. For this reason, the first thermal expansion layer 12 is provided in a region (a first region 10A illustrated in FIG. 1) in which at least the first convex portion 11a is formed on the first surface of the base material 11. Further, the first thermal expansion layer 12 may be formed also in a region where the first convex portion 11a is not formed (a third region 10C illustrated in FIG. 1).

In addition, the first thermal expansion layer 12 may have a thickness that can deform at least the base material 11 into a desired shape. For this reason, the first thermal expansion layer 12 can be formed to be the same as or thinner than the thickness of the base material 11. As a result, the material for forming the first thermal expansion layer 12 can be reduced, and the cost can be reduced. However, for example, in the case where it is necessary to form the first thermal expansion layer 12 thick, such as the case where the first thermal expansion layer 12 needs to be foamed to a high degree depending on the shape of the shaped article, which is difficult to deform the base material 11, the first thermal expansion layer 12 may be formed thicker than the base material 11.

The second thermal expansion layer 13 is provided on the second surface (the lower surface in FIG. 1) of the base material 11. Similar to the first thermal expansion layer 12, the second thermal expansion layer 13 is a layer that expands to a size according to the degree of heating, and a thermally expandable material is dispersed in the binder. The second thermal expansion layer 13 is not limited to having one layer, and may have a plurality of layers. The binder and the thermally expandable microcapsules of the second thermal expansion layer 13 are the same as the binder and the thermally expandable capsule described in the first thermal expansion layer 12. The first thermal expansion layer 12 and the second thermal expansion layer 13 may be formed partially or entirely of different materials, but if they are formed using the same material, cost can be reduced, which is preferable.

In addition, the second thermal expansion layer 13 is also used to form a second convex portion 11c on the second surface of the base material 11 in the same manner as the first thermal expansion layer 12. For this reason, the second thermal expansion layer 13 is provided in the region (the second region 10B illustrated in FIG. 1) in which at least the second convex portion 11c is formed on the second surface of the base material 11. In addition, the second thermal expansion layer 13 may also be formed in a region where the second convex portion 11c is not formed (a region similar to the third region 10C in the first thermal expansion layer 12). Furthermore, the second thermal expansion layer 13 may also have a thickness that allows at least the base material 11 to be deformed into a desired shape. Therefore, the second thermal expansion layer 13 can be formed to be the same as or thinner than the thickness of the base material 11. However, as in the case of the first thermal expansion layer 12, the second thermal expansion layer 13 may be formed thicker than the base material 11.

In order to deform the base material 11 satisfactorily, it is preferable that, in a region where the base material 11 is deformed using one of the first thermal expansion layer 12 and the second thermal expansion layer 13, the deformation of the base material 11 is not inhibited by the other of the first thermal expansion layer 12 and the second thermal expansion layer 13. Therefore, it is preferable that the second thermal expansion layer 13 is not provided on the second surface of the base material 11 in the region (the first area 10A illustrated in FIG. 1) of the base material 11 to be deformed by the first thermal expansion layer 12. Similarly, it is preferable that the first thermal expansion layer 12 is not provided on the first surface of the base material 11 in the region of the base material 11 to be deformed by the second thermal expansion layer 13 (the second region 10B illustrated in FIG. 1). Therefore, it is preferable that the first region 10A and the second region 10B be provided so as not to overlap with each other. In other words, the first region 10A and the second region 10B are provided so as not to face each other via the base material 11. Now that, in the region not deformed by any of the first thermal expansion layer 12 and the second thermal expansion layer 13 in the base material 11 (for example, the third region 10C illustrated in FIG. 1), at least one of the first thermal expansion layer 12 and the second thermal expansion layer 13 may be provided.

(Production Method of Resin Molded Sheet 10)

Furthermore, the resin molded sheet 10 according to the present embodiment is produced as described below.

Figure 2A:
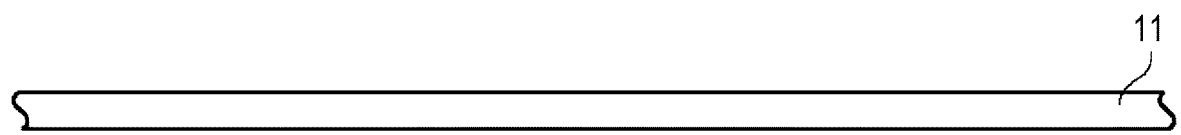
FIGS. 2A to 2C are cross-sectional views illustrating a production method of a resin molded sheet according to the first embodiment.

First, as illustrated in FIG. 2A, as the base material 11, a sheet-like material, for example, non-stretched PET is prepared as the base material 11. The base material 11 may be in the form of a roll or may be cut in advance.

Figure 2B:
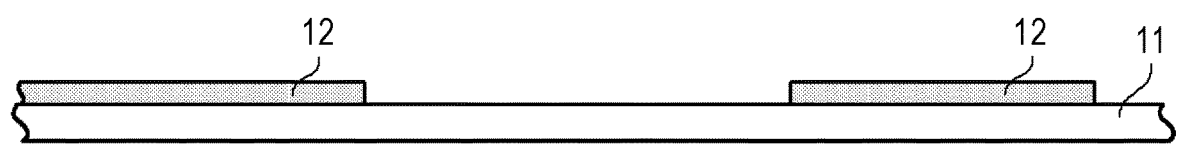

Next, a binder made of a thermoplastic resin or the like and a thermally expandable material (thermally expandable microcapsule) are mixed to prepare an ink for forming the first thermal expansion layer 12. Using this ink, the ink is placed in a pattern corresponding to the first thermal expansion layer 12 on the first surface of the base material 11 by any printing apparatus, for example, a screen printing apparatus. Subsequently, the solvent is evaporated to form the first thermal expansion layer 12 as illustrated in FIG. 2B. In addition, in order to form the first thermal expansion layer 12 of desired thickness, printing may be performed multiple times.

Figure 2C:
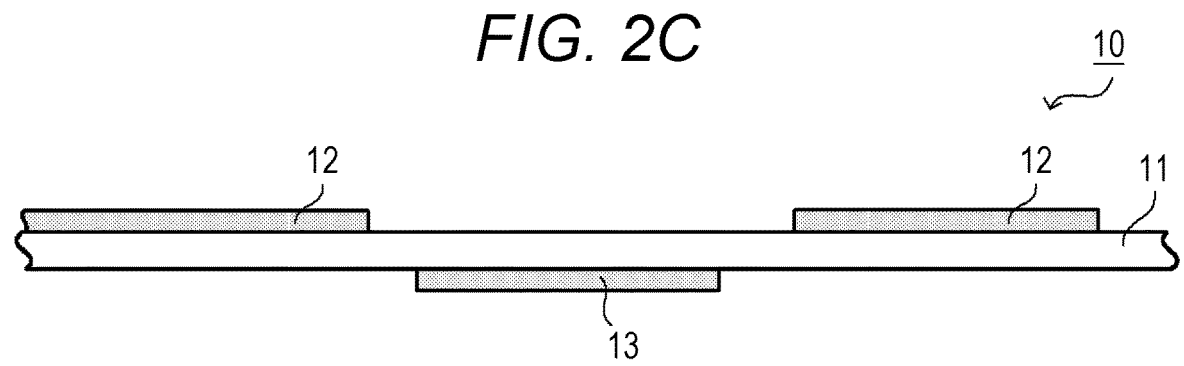

Subsequently, a binder made of a thermoplastic resin or the like and a thermally expandable material are mixed to prepare an ink for forming the second thermal expansion layer 13. Using this ink, the ink is placed on the second surface of the base material 11 in a pattern corresponding to the second thermal expansion layer 13 by any printing apparatus, for example, a screen printing apparatus. Subsequently, the solvent is evaporated to form a second thermal expansion layer 13 as illustrated in FIG. 2C. Printing may be performed multiple times to form the second thermal expansion layer 13 having a desired thickness. The second thermal expansion layer 13 may be formed using the same ink as the ink for forming the first thermal expansion layer 12. When the roll-shaped base material 11 is used, cutting is performed if necessary.

Thereby, the resin molded sheet 10 is produced.

(Shaped Article 41)

Next, the shaped article 41 will be described using the drawings. The shaped article 41 is made by expanding the first thermal expansion layer 12 and the second thermal expansion layer 13 of the resin molded sheet 10.

Figure 3A:
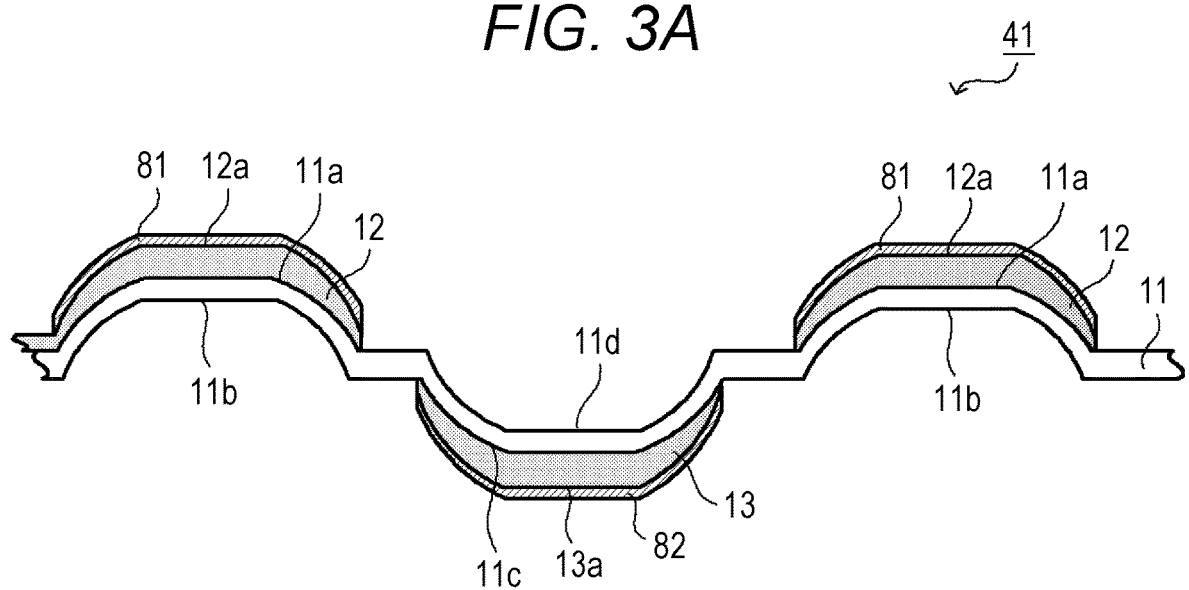
FIG. 3A is a cross-sectional view of a shaped article according to the first embodiment.
Figure 3B:
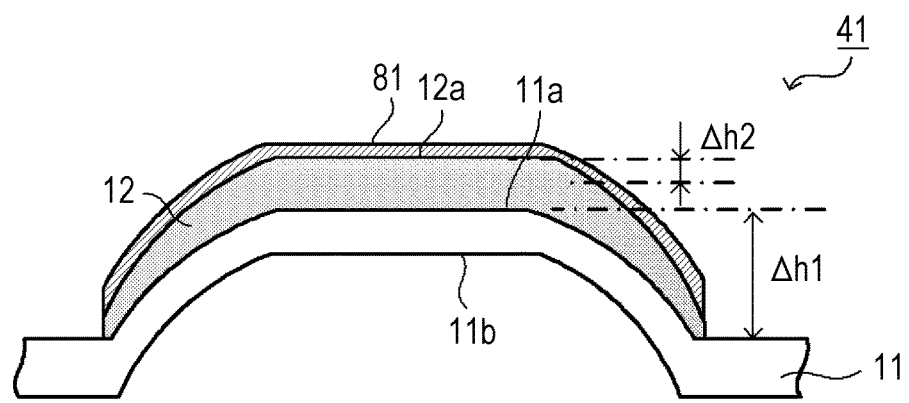
FIG. 3B is a cross-sectional view illustrating a part of the shaped article.

In the shaped article 41, as illustrated in FIG. 3A, the first thermal expansion layer 12 has a convex portion 12a on the upper surface, and the second thermal expansion layer 13 is provided with a convex portion 13a protruding in the downward direction illustrated in FIG. 3A. FIG. 3B is a cross-sectional view of a part of the shaped article 41. The base material 11 has a convex portion 11a which is deformed to follow the expansion of the first thermal expansion layer 12 on the first surface. Similarly, the base material 11 has, on the second surface, the convex portion 11c deformed to follow the expansion of the second thermal expansion layer 13. Further, the base material 11 has a concave portion 11b having a shape corresponding to the first convex portion 11a and a concave portion 11d having a shape corresponding to the second convex portion 11c.

The first convex portion 11a and the convex portion 12a of the first thermal expansion layer 12 project from a surrounding region on the first surface of the base material 11. Similarly, the second convex portion 11c and the convex portion 13a of the second thermal expansion layer 13 project from a surrounding region on the second surface of the base material 11. Further, a first electromagnetic wave heat conversion layer (hereinafter referred to as a heat conversion layer) 81 used to expand the first thermal expansion layer 12 is provided on the convex portion 12a. A second electromagnetic wave heat conversion layer (hereinafter referred to as a heat conversion layer) 82 used to expand the second thermal expansion layer 13 is also provided on the convex portion 13a.

In the present embodiment, as described later, the first heat conversion layer 81 and the second heat conversion layer 82 are irradiated with electromagnetic waves to irradiate the first heat conversion layer 81 and the second heat conversion layer 82 with each other. Examples of the electromagnetic wave heat conversion material include infrared absorbers such as cesium tungsten oxide and lanthanum hexaboride, and carbon black. The first heat conversion layer 81 and the second heat conversion layer 82 can also be referred to as a heat transfer layer because they take heat when irradiated with electromagnetic waves. The heat generated by the first heat conversion layer 81 provided on the resin molded sheet 10 is transferred to the base material 11 to soften the base material 11. In addition, the heat generated in the first heat conversion layer 81 is transferred to the first thermal expansion layer 12 to cause the thermally expandable material in the first thermal expansion layer 12 to foam. As a result, the first thermal expansion layer 12 expands. The first heat conversion layer 81 converts the electromagnetic waves into heat more quickly, as compared with other regions where the first heat conversion layer 81 is not provided. Therefore, only the region in the vicinity of the first heat conversion layer 81 can be selectively heated, and only a specific region of the first thermal expansion layer 12 can be selectively expanded. Further, the base material 11 deforms so as to follow the expansion direction of the first thermal expansion layer 12 when the first thermal expansion layer 12 is foamed and expanded, and maintains its shape after deformation. The same applies to the second heat conversion layer 82, and the heat generated in the second heat conversion layer 82 can selectively expand a specific region of the second thermal expansion layer 13. Thereby, the base material 11 deforms so as to follow the expansion direction of the second thermal expansion layer 13.

As the first thermal expansion layer 12 expands, the convex portion 12a illustrated in FIG. 3A is formed on the first thermal expansion layer 12. When the convex portion 12a is formed, the expansion force of the first thermal expansion layer 12 acts in the direction opposite to the base material 11 (upper side illustrated in FIG. 3A). The base material 11 is deformed upward as illustrated in FIG. 3A by being pulled by the expansion force. Then, the first convex portion 11a is formed on the upper surface of the base material 11 such that it may project from a surrounding region. Further, on the back surface of the base material 11, the first concave portion 11b corresponding to the shape of the first convex portion 11a formed on the front surface is formed. The shape of the first concave portion 11b is substantially the same as that of the first convex portion 11a, and is a shape in which the first convex portion 11a is reduced by the thickness of the base material 11. In this specification, the shapes of the convex portion 12a of the first thermal expansion layer 12, and the first convex portion 11a and the first concave portion 11b of the base material 11 are expressed as an embossed shape.

Similarly, as the second thermal expansion layer 13 expands, the convex portion 13a illustrated in FIG. 3A is formed on the second thermal expansion layer 13. Since the expansion force of the second thermal expansion layer 13 acts in the direction opposite to the base material 11 (the lower side illustrated in FIG. 3A) when the convex portion 13a is formed, the base material 11 deforms downward as illustrated in FIG. 3A. Then, the second convex portion 11c is formed on the lower surface of base material 11 such that it may project from a surrounding region. Further, on the surface of the base material 11, the second concave portion 11d corresponding to the shape of the second convex portion 11c formed on the lower surface is formed. The shape of the second concave portion 11d is substantially the same as that of the second convex portion 11c. The shapes of the convex portion 13a of the second thermal expansion layer 13, the second convex portion 11c and the second concave portion 11d of the base material 11 are also expressed as an embossed shape.

Further, in the resin molded sheet 10 of the present embodiment, in particular, the first thermal expansion layer 12 is used to deform the base material 11, and as illustrated in FIG. 3B, the deformation amount $\Delta h1$ of the base material 11 may be larger than the foam height $\Delta h2$ of the first thermal expansion layer 12. The amount of deformation $\Delta h1$ is the height of the first convex portion 11a as compared with the surface of the non-deformed region of the base material 11. Further, the foam height (difference) $\Delta h2$ of the first thermal expansion layer 12 is a height obtained by subtracting the height before expansion of the first thermal expansion layer 12 from the height after expansion of the first thermal expansion layer 12. The difference $\Delta h2$ can also be referred to as an increase in the height of the first thermal expansion layer 12 caused by expansion of a thermally expandable material. The same applies to the amount of deformation of the base material 11 formed using the second thermal expansion layer 13.

The shaped article 41 is used, for example, as a lamp shade. In this case, the shaped article 41 may include a color ink layer (not illustrated) on at least one of the front side surface and the back side surface of the shaped article 41. A color ink layer is a layer which consists of an ink used with arbitrary printing apparatuses, such as offset printing and flexographic printing. The color ink layer may be formed of any of water-based ink, oil-based ink, ultraviolet curable ink, and the like. In addition, the color ink layer is a layer that expresses an arbitral image such as letters, numbers, photographs, and patterns. In particular, in the case of forming a color ink layer by using, for example, an aqueous ink jet printer, it is preferable to provide an ink receiving layer (not illustrated) for receiving ink on a resin molded sheet to form a color ink layer. The shaped article 41 is not limited to the lamp shade and can be used for any item.

(Production Method of Shaped Article 41)

Next, with reference to FIGS. 4, 5 and 6A to 6C, the flow of the production method of the shaped article 41 using the resin molded sheet 10 will be described. In the production method of the following shaped article 41, although a sheet-fed type is described as an example, but rolled resin molded sheet 10 may be used.

Figure 4:
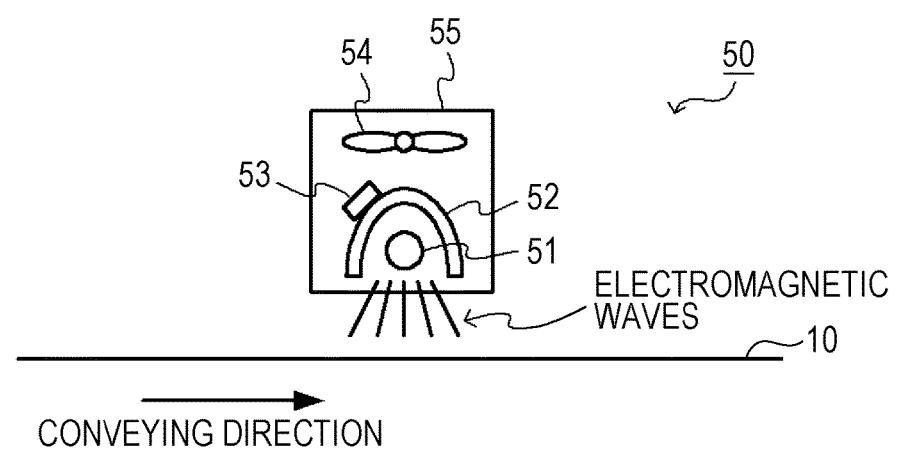
FIG. 4 is a view of a configuration of an expansion device.

First, FIG. 4 illustrates an expansion device 50 for expanding the first thermal expansion layer 12 and the second thermal expansion layer 13. The expansion device 50 includes an irradiation unit 51, a reflecting plate 52, a temperature sensor 53, a cooling unit 54, and a housing 55. The irradiation unit 51, the reflecting plate 52, the temperature sensor 53, and the cooling unit 54 are housed in the housing 55. The resin molded sheet 10 is conveyed under the expansion device 50.

The irradiation unit 51 is provided with a lamp heater, for example, a halogen lamp, and irradiates the resin molded sheet 10 with electromagnetic waves (light) in a near infrared region (wavelength is 750 to 1400 nm), a visible light region (wavelength is 380 to 750 nm), or a mid-infrared region (wavelength is 1400 to 4000 nm). When the resin molded sheet 10 on which a heat conversion layer of a foam ink containing a heat conversion material is printed is irradiated with electromagnetic waves, in the portion where the heat conversion layer is printed, the electromagnetic waves are more efficiently converted into heat than in the portion where the heat conversion layer is not printed. Therefore, the portion of the resin molded sheet 10 on which the heat conversion layer is printed is mainly heated, and a thermally expandable material expands when reaching to the temperature at which expansion starts. Now that, the irradiation unit 51 is not limited to a halogen lamp, and another structure can be applied if electromagnetic waves can be irradiated. Further, the wavelength of the electromagnetic wave is not limited to the above range.

The reflecting plate 52 is an irradiated body that receives the electromagnetic waves emitted from the irradiation unit 51, and is a mechanism that reflects the electromagnetic waves emitted from a lamp heater toward the resin molded sheet 10.

The temperature sensor 53 is a thermocouple, a thermistor, or the like and functions as a measuring unit that measures a temperature of the reflecting plate 52. By measuring the temperature of the reflecting plate 52, the intensity of the electromagnetic wave emitted by the irradiation unit 51, that is, an index of the energy of the electromagnetic wave can be obtained.

The cooling unit 54 is provided on the upper side of the reflecting plate 52. The cooling unit 54 includes at least one air supply fan and functions as a cooling unit that cools the inside of the expansion device 50.

In the expansion device 50, the resin molded sheet 10 receives electromagnetic waves emitted by the irradiation unit 51 while being conveyed by a conveying roller (not illustrated) or the like. As a result, the first heat conversion layer 81 and/or the second heat conversion layer 82 provided on the resin molded sheet 10 is heated. The heat expands the first thermal expansion layer 12 and/or the second thermal expansion layer 13 to deform the base material 11.

Further, in the production method of a shaped article according to the present embodiment, by control of lightness and darkness of lightness and darkness images (first foaming data, second foaming data), control of electromagnetic waves, and the like, the expansion of a thermally expandable material is controlled, and the raised heights of the first thermal expansion layer 12 and the second thermal expansion layer 13 are controlled, to form a desired convex or uneven shape on the front surface of the resin molded sheet 10. Furthermore, control of electromagnetic waves means controlling the energy amount which the resin molded sheet 10 receives per unit area to expand the resin molded sheet 10 to desired height when the resin molded sheet 10 is irradiated with electromagnetic waves and expanded in the expansion device 50.

(Production Method of Shaped Article 41)

Figure 5:
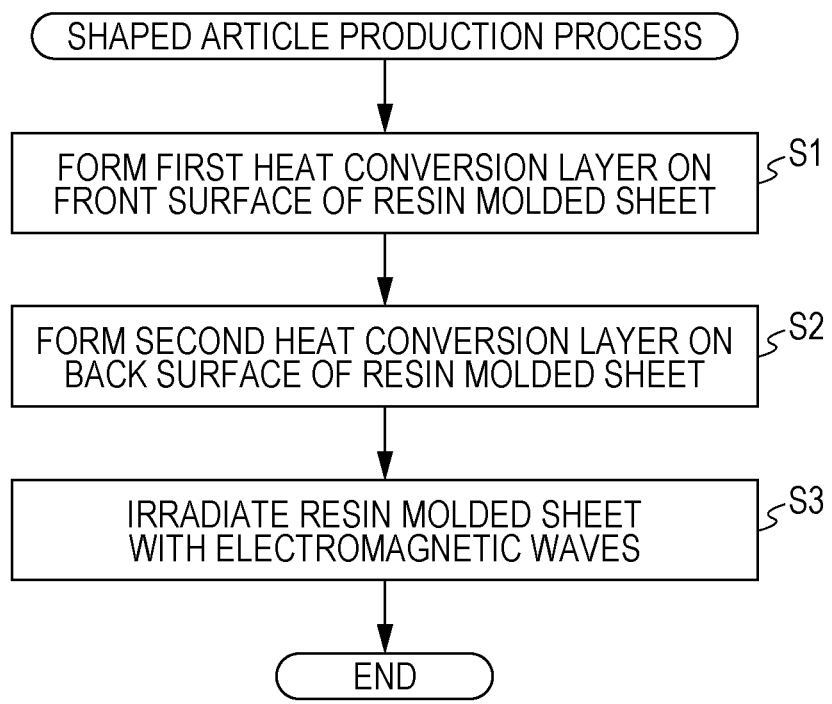
FIG. 5 is a flowchart illustrating a production method of the shaped article according to the first embodiment.
Figure 6A:
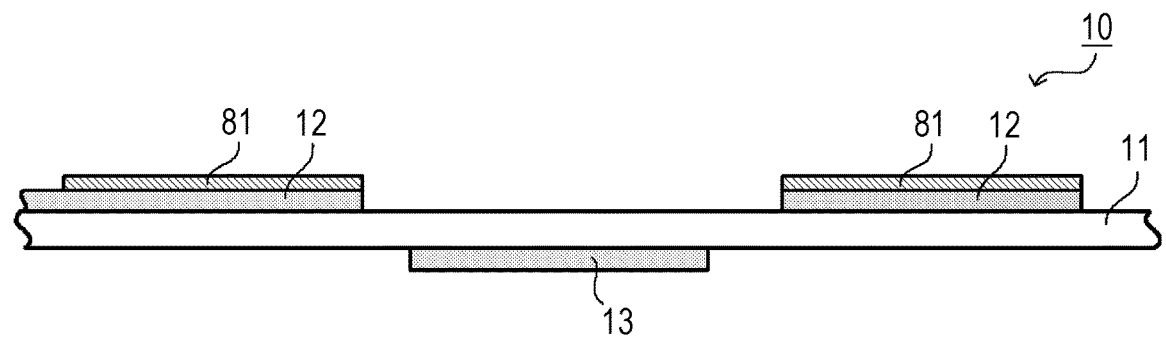
FIGS. 6A to 6C are cross-sectional views schematically illustrating the production method of the shaped article according to the first embodiment.
Figure 6B:
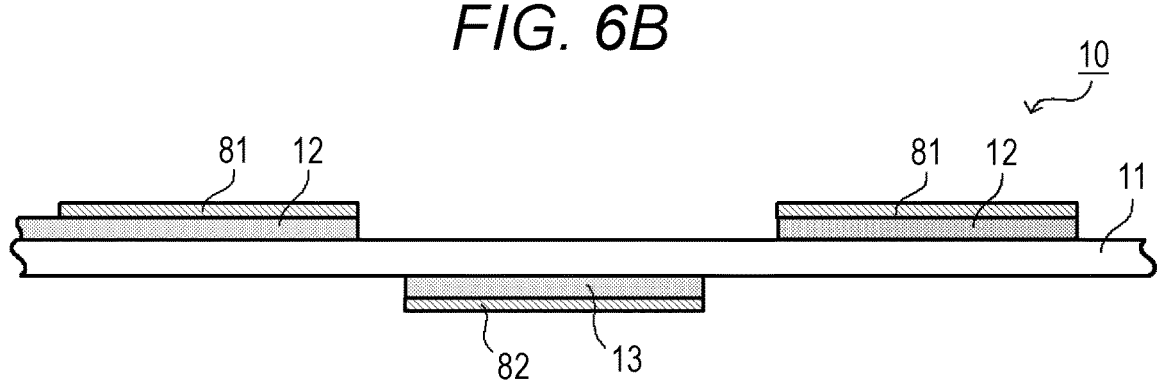
Figure 6C:
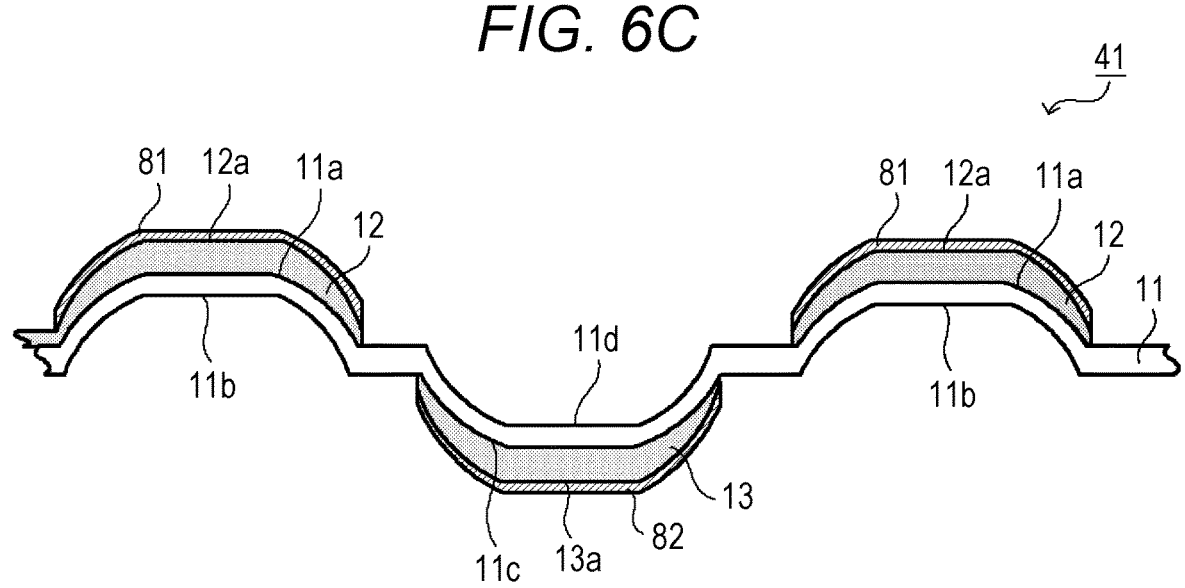

Next, with reference to the flowchart illustrated in FIG. 5 and the cross-sectional views of the resin molded sheet 10 illustrated in FIGS. 6A to 6C, the flow of a process (shaped article production process) of molding the resin molded sheet 10 to produce the shaped article 41 will be described.

First, the resin molded sheet 10 is prepared. First foaming data (data for forming the first heat conversion layer 81) indicating a portion to be foamed and expanded on the front surface of the resin molded sheet 10 and second foaming data (data for forming the second heat conversion layer 82) indicating a portion to be foamed and expanded on the back surface of the resin molded sheet 10 are determined in advance. The resin molded sheet 10 is conveyed to a printing apparatus (not illustrated), and the first heat conversion layer 81 is printed on the front surface of the resin molded sheet 10 (step S1). The first heat conversion layer 81 is a layer formed of an ink containing an electromagnetic wave heat conversion material, for example, a foam ink containing carbon black. The printing apparatus prints a foam ink containing the heat conversion material on the front surface of the resin molded sheet 10 in accordance with the specified first foaming data. As a result, as illustrated in FIG. 6A, the first heat conversion layer 81 is formed on the front surface of the resin molded sheet 10.

Secondly, the resin molded sheet 10 is conveyed to a printing apparatus (not illustrated), and the second heat conversion layer 82 is printed on the back surface of the resin molded sheet 10 (step S2). The second heat conversion layer 82 is a layer formed of an ink containing an electromagnetic wave heat conversion material, for example, a foam ink containing carbon black. The printing apparatus prints a foam ink containing the heat conversion material on the back surface of the resin molded sheet 10 in accordance with the specified second foaming data. As a result, as illustrated in FIG. 6B, the second heat conversion layer 82 is formed on the back surface of the resin molded sheet 10. Note that steps S1 and S2 may be performed in a reverse order.

Thirdly, the resin molded sheet 10 on which the first heat conversion layer 81 and the second heat conversion layer 82 are printed is conveyed to the expansion device 50. In the expansion device 50, the irradiation unit 51 applies electromagnetic waves to the conveyed resin molded sheet 10 (step S3). Specifically, in the expansion device 50, the irradiation unit 51 irradiates the front surface (first surface) of the resin molded sheet 10 with electromagnetic waves. The heat conversion material contained in the first heat conversion layer 81 printed on the front surface of the resin molded sheet 10 generates heat by absorbing the irradiated electromagnetic waves. As a result, the first heat conversion layer 81 generates heat, and the base material 11 is softened. Furthermore, the heat generated in the first heat conversion layer 81 is transferred to the first thermal expansion layer 12, and the thermally expandable material foams and expands. As a result, as illustrated in FIG. 6C, the area of the first thermal expansion layer 12 of the resin molded sheet 10 on which the first heat conversion layer 81 is printed expands and swells. The base material 11 softened by heat from the first heat conversion layer 81 is deformed by being pulled by the expanding force of the first thermal expansion layer 12.

Similarly, the electromagnetic wave irradiated by the irradiation unit 51 is also absorbed by the heat conversion material contained in the second heat conversion layer 82 through the base material 11. As a result, the second heat conversion layer 82 generates heat, and the base material 11 is softened. Further, the heat generated in the second heat conversion layer 82 expands and swells the region where the second heat conversion layer 82 of the second thermal expansion layer 13 is printed. As a result, as illustrated in FIG. 6C, the base material 11 softened by heat from the second heat conversion layer 82 is deformed by being pulled by the expanding force of the second thermal expansion layer 13. Thus, the irradiation unit 51 can expand the first thermal expansion layer 12 and the second thermal expansion layer 13 simultaneously by irradiating electromagnetic waves from one side of the resin molded sheet 10. In this case, it is preferable that the base material 11 be transparent such that the electromagnetic waves can be well transmitted to the second surface of the base material 11. Now that, the irradiation of the electromagnetic wave may be performed on the back surface of the resin molded sheet 10. In this case, the electromagnetic wave is absorbed by the heat conversion material contained in the second heat conversion layer 82 and absorbed by the heat conversion material contained in the first heat conversion layer 81 via the base material 11.

By the above-described procedure, the base material 11 of the resin molded sheet 10 is deformed, and the shaped article 41 is produced.

Thus, in the present embodiment, by forming a first heat conversion layer 81 and the second heat conversion layer 82 by printing and by irradiating the heat conversion layer with electromagnetic waves, the resin molded sheet 10 can be easily deformed into a desired shape. In particular, since the base material 11 can be deformed by expanding the first thermal expansion layer 12 and the second thermal expansion layer 13, there is no need to use molds for molding, and it becomes possible to reduce the time and cost which are required for molding of the resin molded sheet 10.

Furthermore, in the present embodiment, the resin molded sheet 10 can be easily molded, and the shaped article can be formed, by arbitrarily controlling the position, height, and the like at which the first thermal expansion layer 12 and the second thermal expansion layer 13 are raised by using such as the control of lightness and darkness between the first heat conversion layer 81 (first foaming data) and the second heat conversion layer 82 (second foaming data) and the control of electromagnetic waves.

In addition, by foaming and expanding the first thermal expansion layer 12 and the second thermal expansion layer 13 simultaneously, the first surface and the second surface of the base material 11 can be simultaneously molded and can be further easily molded. In particular, when a transparent resin sheet is selected as the base material 11, the first thermal expansion layer 12 and the second thermal expansion layer 13 can also be expanded by irradiation of the electromagnetic wave from any one surface of the resin molded sheet 10.

Second Embodiment

Hereinafter, a resin molded sheet according to a second embodiment, a production method of the resin molded sheet, a shaped article, and a production method of the shaped article will be described with reference to the drawings. A resin molded sheet 20 according to the present embodiment differs from the resin molded sheet 10 according to the first embodiment in that a first intermediate layer 21 is provided between a base material 11 and a first thermal expansion layer 12, and a second intermediate layer 22 is provided between the base material 11 and a second thermal expansion layer 13. About the feature in common with the first embodiment, the same numerals are attached and detailed explanation is omitted.

(Resin Molded Sheet 20)

Figure 7:
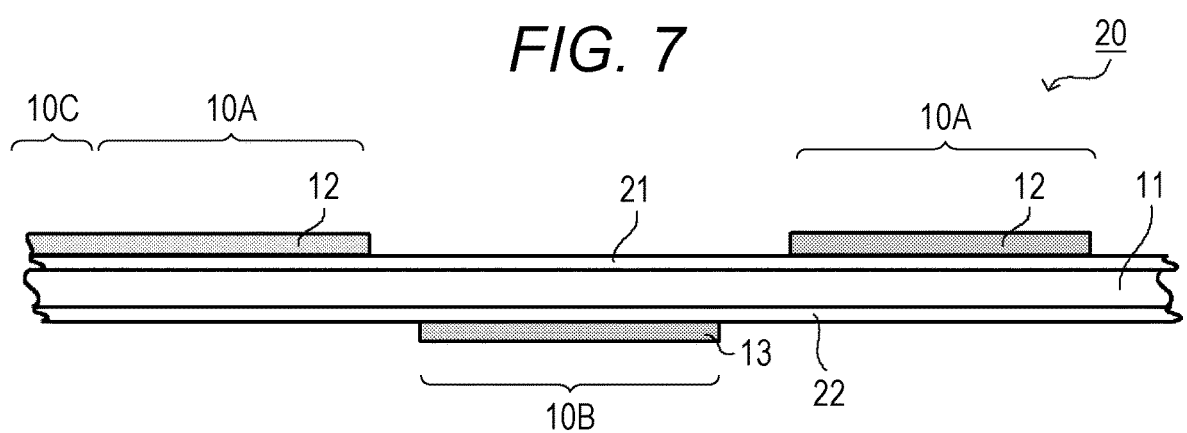
FIG. 7 is a cross-sectional view illustrating the outline of a resin molded sheet according to a second embodiment.

The resin molded sheet 20 includes, as illustrated in FIG. 7, the base material 11, the first intermediate layer 21, the first thermal expansion layer 12, the second intermediate layer 22, and the second thermal expansion layer 13. The base material 11, the first thermal expansion layer 12, and the second thermal expansion layer 13 are similar to the base material 11, the first thermal expansion layer 12, and the second thermal expansion layer 13 of the resin molded sheet 10 of the first embodiment.

The first intermediate layer 21 is provided on the first surface (upper surface illustrated in FIG. 7) of the base material 11. The first intermediate layer 21 is releasably adhered to the base material 11. In addition, a first thermal expansion layer 12 is provided on the first intermediate layer 21. In the present embodiment, the first intermediate layer 21 is provided between the base material 11 and the first thermal expansion layer 12, and also by making the peel strength between the first intermediate layer 21 and the base material 11 weaker than the peel strength between the first intermediate layer 21 and the first thermal expansion layer 12, the first intermediate layer 21 can be peeled off from the base material 11, whereby the first thermal expansion layer 12 can be removed from the base material 11.

The first intermediate layer 21 is provided under part or all of the first thermal expansion layer 12. The first intermediate layer 21 may be provided to cover the entire first surface of the base material 11 as illustrated in FIG. 7, and the first surface of the base material 11 may be provided to remove only a part of the first thermal expansion layer 12, such as a portion where the first thermal expansion layer 12 peels after expansion.

As the peel strength of the first intermediate layer 21, it is desired that the first thermal expansion layer 12 do not peel off from the resin molded sheet 20 at least in the normal use range before the expansion of the first thermal expansion layer 12. Examples of the normal range of use include the general operation performed by a user, for example, carrying the resin molded sheet 20, and generally expected usage in the resin molded sheet 20 such as printing on the resin molded sheet 20 and expanding the first thermal expansion layer 12.

In addition, it is preferable that the first intermediate layer 21 has a breaking strength not to break inside when the first thermal expansion layer 12 is peeled off. Examples of such the first intermediate layer 21 include a resin film provided with an adhesive layer on one side. As the adhesive layer, a thermosetting adhesive can be used. As the thermosetting adhesive, for example, an adhesive using a vinyl chloride/vinyl acetate copolymer resin is suitable. The solvent for the adhesive may be either water-based or solvent-based. In addition, as the adhesive layer, a pressure sensitive adhesive such as an acrylic pressure sensitive adhesive or a silicone pressure sensitive adhesive may be used. The resin film is made of, for example, a resin selected from polyester, polyethylene, polyvinyl alcohol, polyethylene terephthalate, or copolymers thereof. Further, the surface of the resin film on which the adhesive layer is provided is made to face the base material 11, and the first intermediate layer 21 is peelably adhered to the base material 11 by the adhesive layer. As the first intermediate layer 21, a film made of ethylene-vinyl alcohol copolymer can be used. For example, the film of the first intermediate layer 21 has a thickness of 12 to 15 µm, and the adhesive layer has a thickness of 2 µm. In addition, when the peel strength of the adhesive layer is 0.06N/20 mm or more when measured by a 180 degree peel strength test, it can be substantially prevented that the first intermediate layer 21 is peeled from the base material 11 by user's general operation. Furthermore, to peel the first intermediate layer 21 favorably from the base material 11, the peel strength of an adhesive layer is preferably 0.5 N/20 mm or less, and also 0.4 N/20 mm or less, when it is measured by the 180 degree peel strength test.

Further, the first intermediate layer 21 is not limited to the configuration having an adhesive layer and a film. The intermediate layer may have a peel strength between the first intermediate layer 21 and the base material 11 that is weaker than the peel strength between the first intermediate layer 21 and the first thermal expansion layer 12. For example, the intermediate layer can be formed using a resin selected from polyvinyl alcohol (PVA) resins, polyester resins, polyurethane resins, acrylic resins and the like. As such resin, TAKAMATSU OIL & FAT CO., LTD. NS625 is exemplified.

The first thermal expansion layer 12 is provided on the first surface of the base material 11, and at least a part of the first thermal expansion layer 12 is provided on the first intermediate layer 21. Similar to the first thermal expansion layer 12, the first thermal expansion layer 12 according to the first embodiment is a layer that expands to a size according to the degree of heating, and a thermally expandable material is dispersed in the binder. The thermally expandable material and the material of the binder are the same as in the first embodiment.

The second intermediate layer 22 is provided on the second surface (the lower surface illustrated in FIG. 7) of the base material 11. The second intermediate layer 22 is peelably adhered to the base material 11. In addition, the second thermal expansion layer 13 is provided on the second intermediate layer 22. Similar to the first intermediate layer 21, the second intermediate layer 22 also has the peel strength between the second intermediate layer 22 and the base material 11 that is weaker than the peel strength between the second intermediate layer 22 and the second thermal expansion layer 13. Consequently, the second thermal expansion layer 13 can be peeled and removed from the base material 11. The second intermediate layer 22 may be provided to cover the entire second surface of the base material 11 or may be provided to partially cover the second surface. In this case, in order to remove the second thermal expansion layer 13, the second intermediate layer 22 may be provided at least in the region where the second thermal expansion layer 13 is provided.

Similar to the first intermediate layer 21, the peel strength of the second intermediate layer 22 is also required to be not peeled off at least in a normal usage range. In addition, it is preferable that the second intermediate layer 22 has a breaking strength not to break inside when the second thermal expansion layer 13 is peeled off. As the second intermediate layer 22, a resin film similar to the first intermediate layer 21 and provided with an adhesive layer on one side can be used. Further, similar to the first intermediate layer 21, the second intermediate layer 22 can be also formed using a resin selected from polyvinyl alcohol (PVA) resins, polyester resins, polyurethane resins, acrylic resins and the like.

The second thermal expansion layer 13 is provided on the second intermediate layer 22. Similar to the second thermal expansion layer 13 described in the first embodiment, the second thermal expansion layer 13 is a layer that expands to a size corresponding to the degree of heating (for example, heating temperature, heating time), and a thermally expandable material is dispersed in the binder. The thermally expandable material and the material of the binder are the same as in the first embodiment.

Also in the present embodiment, a first region 10A and a second region 10B are preferably provided so as not to overlap with each other. Now that, in the region not deformed by any of the first thermal expansion layer 12 and the second thermal expansion layer 13 in the base material 11 (for example, the third region 10C illustrated in FIG. 7), at least one of the first thermal expansion layer 12 and the second thermal expansion layer 13 may be provided.

(Production Method of Resin Molded Sheet 20)

Furthermore, the resin molded sheet 20 according to the present embodiment is produced as described below.

Figure 8A:
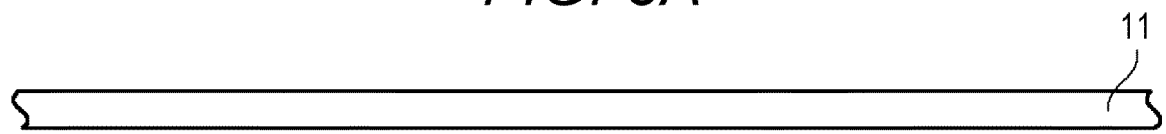
FIGS. 8A to 8D are cross-sectional views illustrating a production method of a resin molded sheet according to the second embodiment.

First, as illustrated in FIG. 8A, as the base material 11, a sheet-like material, for example, non-stretched PET is prepared. The base material 11 may be in the form of a roll or may be cut in advance.

Next, the first intermediate layer 21 is pasted on the first surface of the base material 11 by a laminating apparatus including an input roller, a heater roller, a roller, and an output roller. As the first intermediate layer 21, a resin film provided with an adhesive layer on a surface facing the base material 11 is used. As the adhesive layer, a thermosetting adhesive, for example, vinyl chloride/vinyl acetate copolymer resin is preferably used In addition, as the adhesive layer, a pressure sensitive adhesive such as an acrylic pressure sensitive adhesive or a silicone pressure sensitive adhesive may be used. For example, the base material 11 is placed in the unwinding position of the laminating apparatus in a wound state. The base material 11 is further conveyed between a pair of input rollers toward a heater roller and a roller. A film used as the first intermediate layer 21 is supplied to the heater roller. The film is heated by the heater roller, and is pressed and peelably adhered to the base material 11 when passing between the heater roller and the roller. After adhesion of the film, the base material 11 passes between a pair of output rollers, taken out and wound.

Figure 8B:
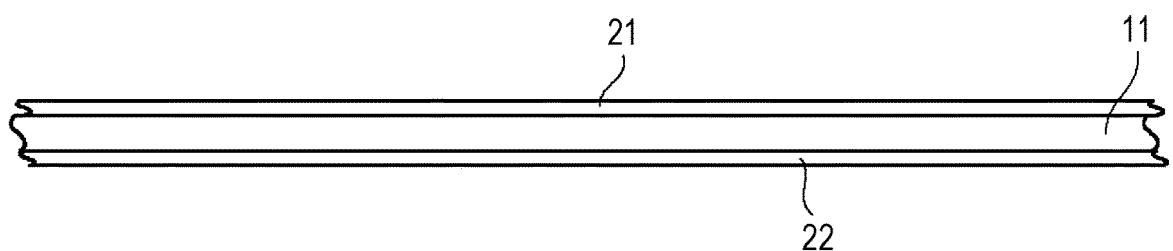

Next, the second intermediate layer 22 is provided on the second surface of the base material 11 in the same manner as the first intermediate layer 21. In addition, it is also possible to supply a film to the first surface and the second surface of the base material 11, and to provide the first intermediate layer 21 and the second intermediate layer 22 in the base material 11 simultaneously. As a result, as illustrated in FIG. 8B, the first intermediate layer 21 and the second intermediate layer 22 are attached onto the base material 11.

Figure 8C:
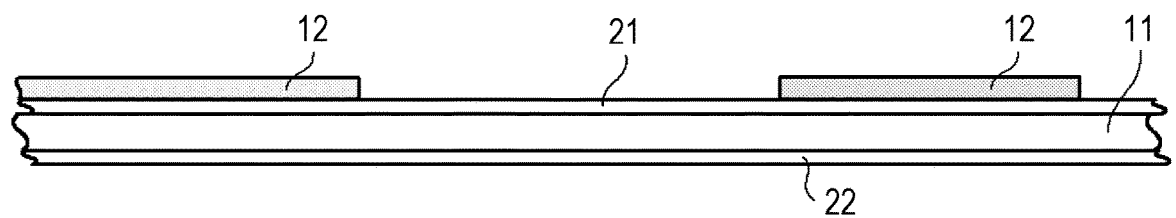
Figure 8D:
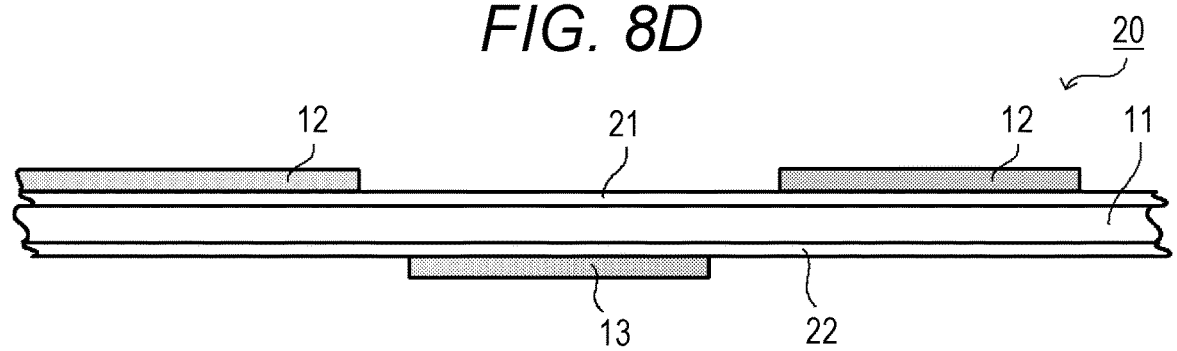

Next, as in the first embodiment, an ink for forming the first thermal expansion layer 12 is prepared, and an arbitral printing apparatus such as a screen printing apparatus is used to form the first thermal expansion layer 12 as illustrated in FIG. 8C. Subsequently, an ink for forming the second thermal expansion layer 13 is prepared as in the first embodiment, and the second thermal expansion layer 13 is formed as illustrated in FIG. 8D. When the roll-shaped base material 11 is used, cutting is performed if necessary. Thereby, the resin molded sheet 20 is produced.

(Shaped Article 42)

Next, a shaped article 42 will be described using the drawings. The shaped article 42 is an article in which after expanding the first thermal expansion layer 12 and the second thermal expansion layer 13 of the resin molded sheet 20 to deform the base material 11, the first intermediate layer 21 and the first thermal expansion layer 12, and the second intermediate layer 22 and the second thermal expansion layer 13 are removed.

Figure 9A:
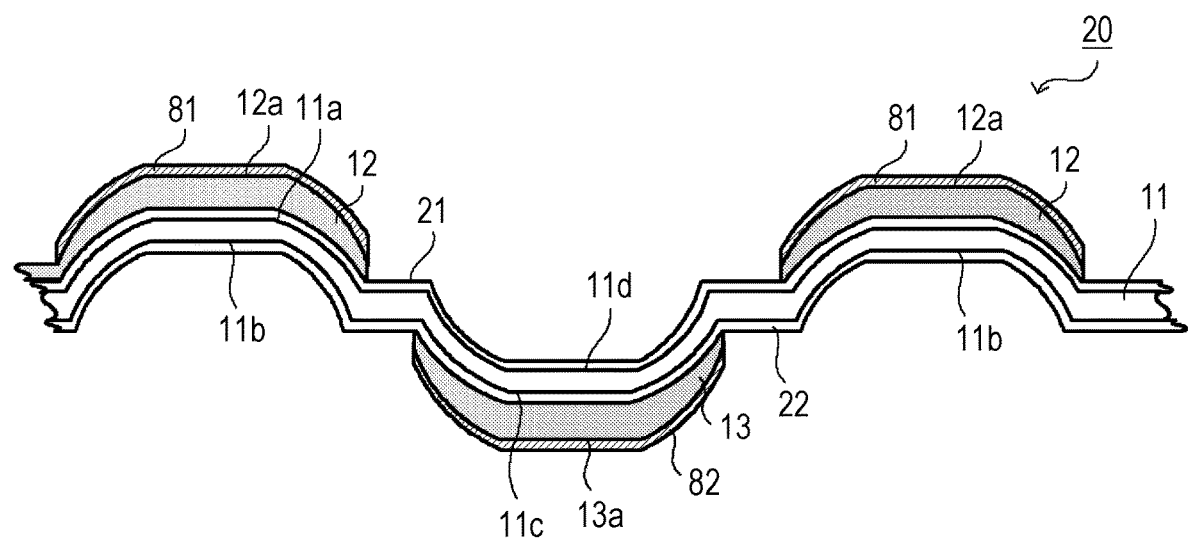
FIG. 9A is a view illustrating a state in which a thermal expansion layer of the resin molded sheet according to the second embodiment is expanded.
Figure 9B:
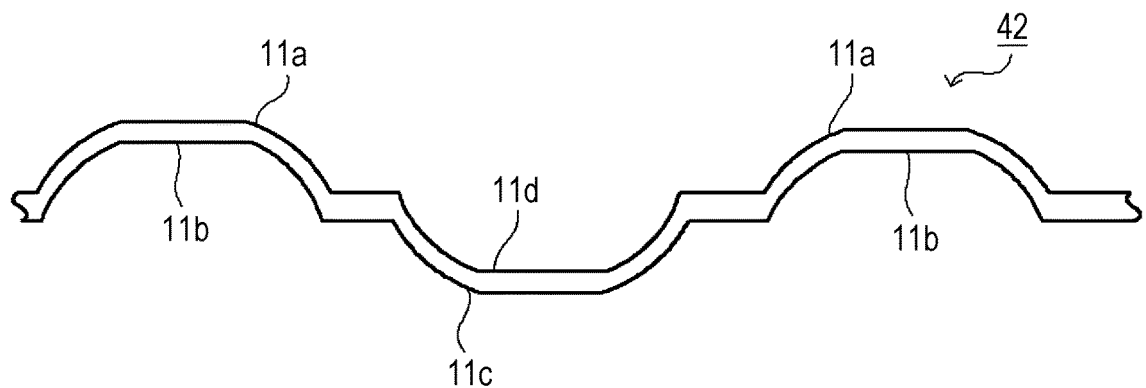
FIG. 9B is a view illustrating an outline of a shaped article according to the second embodiment.

First, the resin molded sheet 20 in a state in which the first thermal expansion layer 12 and the second thermal expansion layer 13 are expanded is illustrated in FIG. 9A, and the shaped article 43 is illustrated in FIG. 9(b). In the resin molded sheet 20 after the first thermal expansion layer 12 and the second thermal expansion layer 13 are expanded, as illustrated in FIG. 9A, the first thermal expansion layer 12 is provided with the convex portion 12a. Further, the second thermal expansion layer 13 also includes the convex portion 13a. The base material 11 is deformed following the first thermal expansion layer 12 and the second thermal expansion layer 13, and includes the same convex portions 11a and 11c as in the first embodiment. Further, the first heat conversion layer 81 is provided on the convex portion 12a, and the second heat conversion layer 82 is provided on the convex portion 13a.

The shaped article 42 from which the first thermal expansion layer 12, the second thermal expansion layer 13 and the like have been removed, as illustrated in FIG. 9B, includes a convex portion 11a on the first surface, and a concave portion 11b having a shape corresponding to the convex portion 11a on the second surface. Further, the shaped article 42 includes the convex portion 11c on the second surface, and the concave portion 11d having a shape corresponding to the convex portion 11c on the first surface. In the shaped article 42 also, the shapes of the convex portions 11a and 11c and the concave portions 11b and 11d can be arbitrarily changed as in the first embodiment, and the usage is also arbitrary. Further, even in the shaped article 42, a color ink layer (not illustrated) may be provided on at least one of the front side surface and the rear side surface of the shaped article 42.

(Production Method of Shaped Article 42)

Figure 10:
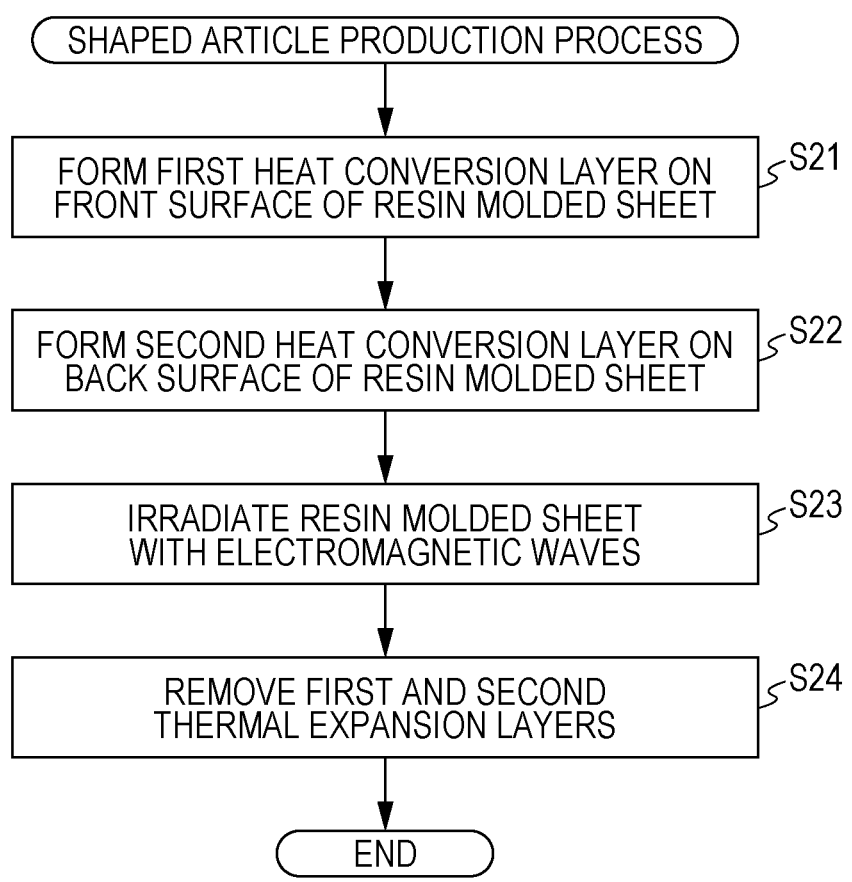
FIG. 10 is a flowchart illustrating a production method of the shaped article according to the second embodiment.

Next, with reference to the flowchart illustrated in FIG. 10 and the cross-sectional views of the resin molded sheet 20 illustrated in FIGS. 11A to 11D, the flow of a process of obtaining the shaped article 42 using the resin molded sheet 20 (shaped article production process) will be described.

Figure 11A:
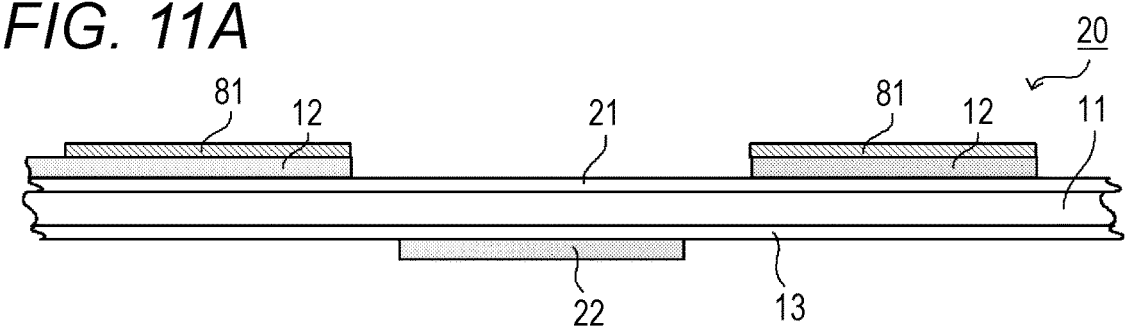
FIGS. 11A to 11D are cross-sectional views schematically illustrating the production method of the shaped article according to the second embodiment.
Figure 11B:
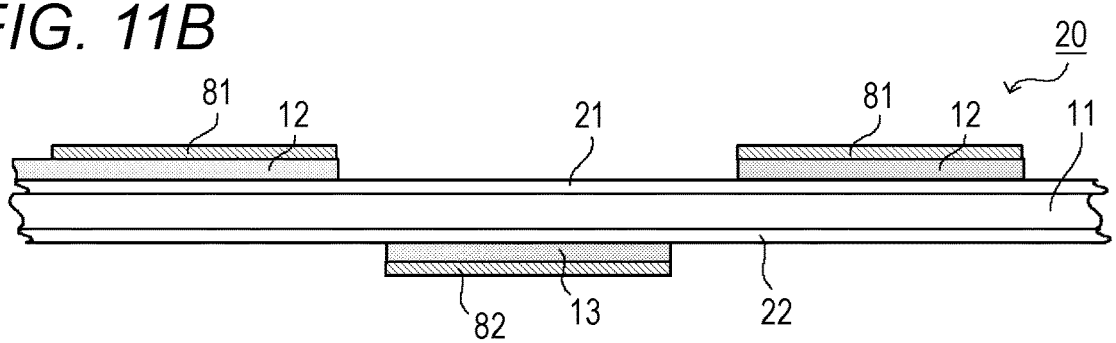

First, as in the first embodiment, as indicated in FIG. 11A, the first heat conversion layer 81 is printed on the first thermal expansion layer 12 provided on the first surface of the resin molded sheet 20 (step S21). Secondly, as in the first embodiment, as illustrated in FIG. 11B, a second heat conversion layer 82 is formed on the second thermal expansion layer 13 provided on the second surface of the resin molded sheet 20 (step S22).

Figure 11C:
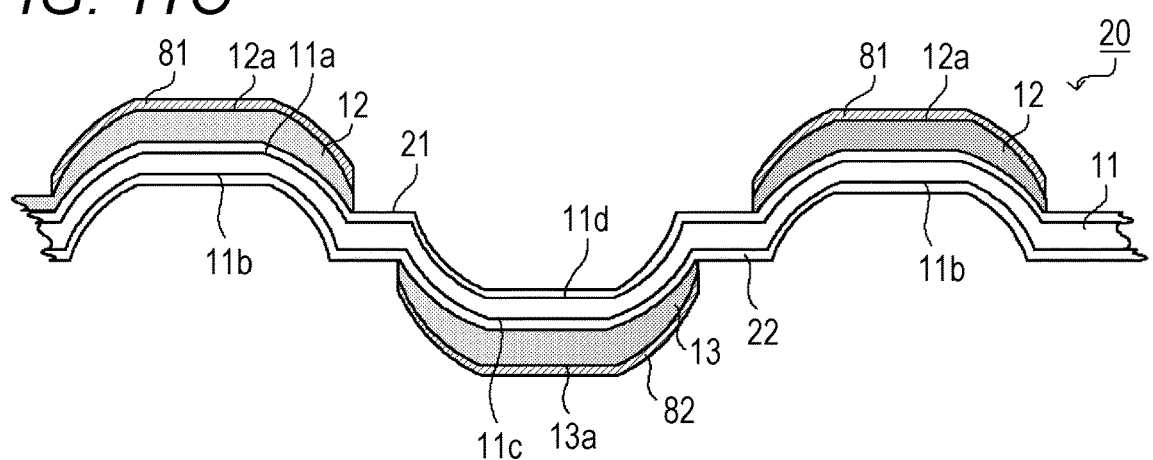

Thirdly, the resin molded sheet 20 is conveyed to the expansion device 50 such that the first surface faces upward, and the resin molded sheet 20 is irradiated with electromagnetic waves by the irradiation unit 51 (step S23). As a result, the first heat conversion layer 81 and the second heat conversion layer 82 generate heat, and the base material 11 is softened. Furthermore, the heat generated in the first heat conversion layer 81 is transferred to the first thermal expansion layer 12, and the thermally expandable material foams and expands. The base material 11 softened by the heat from the first heat conversion layer 81 is deformed by being pulled by the expanding force of the first thermal expansion layer 12 as illustrated in FIG. 11C. Similarly, the heat generated in the second heat conversion layer 82 causes the second thermal expansion layer 13 to foam and expand, and the base material 11 is deformed.

Figure 11D:
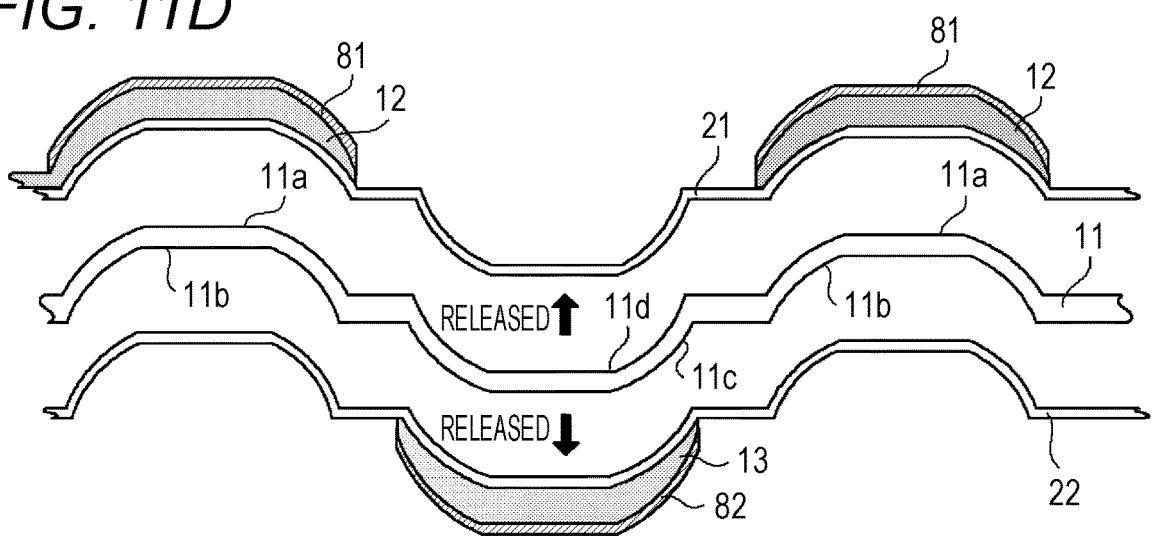

Fourth, the first thermal expansion layer 12 and the second thermal expansion layer 13 are peeled and removed from the base material 11 (step S24). Specifically, at the end of the resin molded sheet 20, part of the first intermediate layer 21 is peeled from the base material 11, and the first intermediate layer 21 and the first thermal expansion layer 12 provided thereon are pulled to peel off from the base material 11. Peeling may be performed manually or by using instruments, machines, etc. As a result, as illustrated in FIG. 11D, the first intermediate layer 21 and the first thermal expansion layer 12 are released. Similarly, the second intermediate layer 22 and the second thermal expansion layer 13 are peeled and removed from the second surface of the base material 11.

By the above-described procedure, the base material 11 of the resin molded sheet 20 is molded, and the shaped article 42 is manufactured.

Thus, according to the present embodiment, by forming a first heat conversion layer 81 and the second heat conversion layer 82 by printing and by irradiating the heat conversion layer with electromagnetic waves, the resin molded sheet 20 can be easily deformed into a desired shape.

The first thermal expansion layer 12 and the second thermal expansion layer 13 have low visible light transmission as compared to the transparent or translucent base material 11, and the first thermal expansion layer 12 and the second thermal expansion layer 13 have low visible light transmission, in particular, in the expanded portion. For this reason, when the thermal expansion layer is present on the transparent or translucent base material 11, the visible light transmittance is reduced by the first thermal expansion layer 12 and the second thermal expansion layer 13. However, in the present embodiment, since the first thermal expansion layer 12 and the second thermal expansion layer 13 can be removed, the translucency of the base material 11 is not impaired by the thermal expansion layer. Therefore, it is particularly suitable for molding transparent or translucent base materials.

In the second embodiment described above, the configuration in which the intermediate layer is provided on both the first surface and the second surface of the base material 11 has been exemplified, but the present embodiment is not limited thereto, and the intermediate layer may be provided on any one surface to peel off the thermal expansion layer provided on one side. In this case, since the thermal expansion layer provided on the other surface is not removed, it remains after molding of the base material 11 as in the first embodiment.

Further, in the second embodiment described above, the configuration in which the thermal expansion layer is removed by providing the intermediate layer between the thermal expansion layer and the base material has been exemplified, but the present embodiment is not limited thereto, and it is also possible to use a binder contained in the thermal expansion layers (the first thermal expansion layer 12 and the second thermal expansion layer 13) as a thermoplastic elastomer to peel off the base material 11 by pulling the thermal expansion layer. Examples of such thermoplastic elastomers include, but are not limited to, polyvinyl chloride, ethylene propylene rubber (EPR), ethylene-vinyl acetate copolymer (EVA), styrenic thermoplastic elastomers, olefinic thermoplastic elastomers, urethane thermoplastic elastomers, or polyester thermoplastic elastomers. It is preferable to use a styrenic elastomer.

Furthermore, when a thermal expansion layer is peeled after deforming the base material 11, it is required that a thermal expansion layer does not fracture when making it peel. In addition, when the thermal expansion layer peels from the base material 11 when the thermal expansion layer is expanded, the base material 11 may not be able to be deformed well. For this reason, the adhesive force between the thermal expansion layer and the base material needs to have an extent such that the base material 11 can deform following the thermal expansion layer. In addition, it is preferable that the breaking strength of the thermal expansion layer be greater than or equal to twice the peel strength between the thermal expansion layer and the base material.

Third Embodiment

Next, a resin molded sheet 30 according to the third embodiment will be described with reference to FIGS. 12A and 12B. The present embodiment is characterized in that a heat conversion material is mixed in a thermal expansion layer. Detailed descriptions of parts overlapping with the above-described embodiments will be omitted.

(Resin Molded Sheet 30)

Figure 12A:
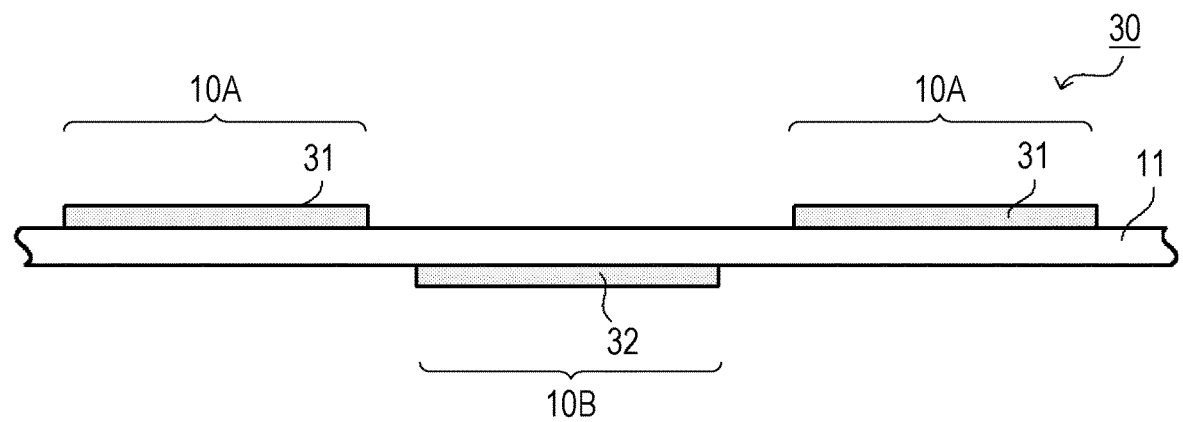
FIG. 12A is a cross-sectional view of the outline of a resin molded sheet according to a third embodiment.
Figure 12B:
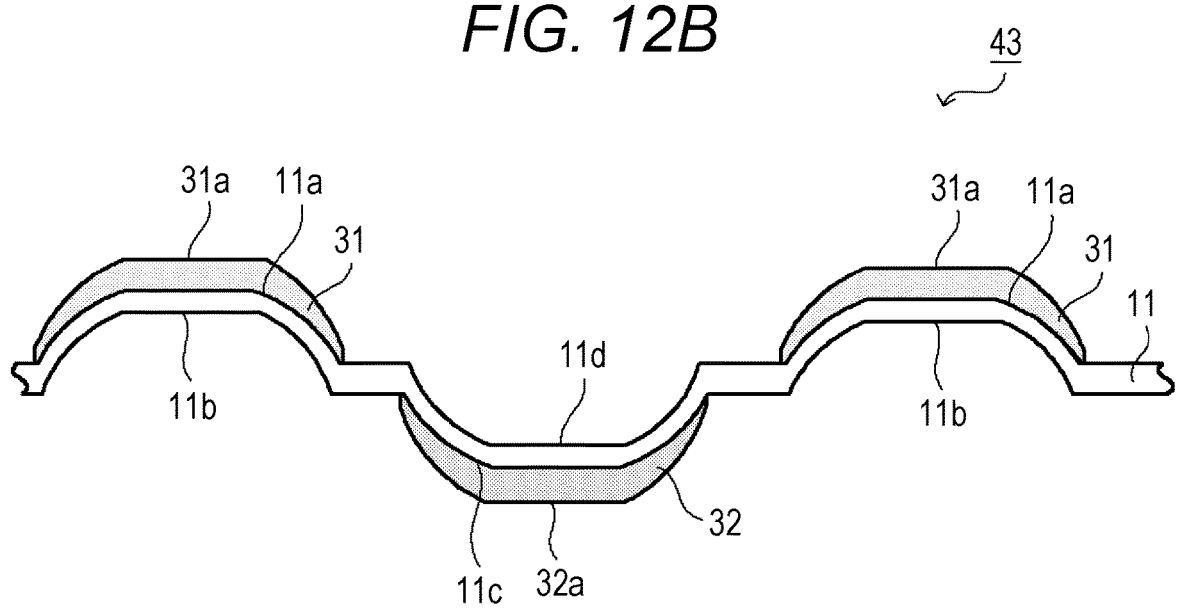
FIG. 12B is a cross-sectional view of a shaped article according to the third embodiment.

A resin molded sheet 30 is provided with a base material 11, a first thermal expansion layer 31, and a second thermal expansion layer 32, as illustrated FIG. 12A. The base material 11 is the same as that of the first embodiment.

As in the first embodiment, the first thermal expansion layer 31 is a layer that expands to a size according to the degree of heating, and a thermally expandable material is dispersed in a binder. The thermally expandable material and the material of the binder are the same as in the first embodiment. The present embodiment is characterized in that it further includes a heat conversion material in addition to the binder and the thermally expandable material.

As the heat conversion material, any material can be used if it can convert electromagnetic waves into heat. Examples of the heat conversion material include carbon and inorganic infrared absorbers. In an expansion device 50 of the present embodiment, it is preferable that the absorptivity is high (the transmissivity is low) particularly in a near infrared region because a halogen lamp is used. In addition, since it is preferable that the heat conversion material do not have a strong color when it is mixed into the thermal expansion layer, it is preferable that the transmittance in the visible light region be high. As such a heat conversion material, lanthanum hexaboride ($LaB_6$) or cesium tungsten oxide is preferable. Note that, as the heat conversion material, one material may be used alone, or two or more different materials may be used in combination.

The first thermal expansion layer 31 is provided on the first surface of the base material 11 as with the first thermal expansion layer 12 of the first embodiment. The first thermal expansion layer 31 is used to form a first convex portion 11a on the first surface of the base material 11. Therefore, the first thermal expansion layer 31 is provided in the region (first region 10A) in which the first convex portion 11a is formed in the base material 11.

Similar to the first thermal expansion layer 31, the second thermal expansion layer 32 is a layer that expands to a size according to the degree of heating, and a thermally expandable material is dispersed in a binder. Further, in the present embodiment, the second thermal expansion layer 32 further includes the above-described heat conversion material.

The second thermal expansion layer 32 is provided on the second surface of the base material 11. The second thermal expansion layer 32 is used to form a second convex portion 11c on the second surface of the base material 11. Therefore, the second thermal expansion layer 32 is provided in the region (second region 10B) in which the second convex portion 11c is formed in the base material 11.

In the present embodiment also, the first region 10A and the second region 10B are preferably disposed so as not to overlap with each other, in other words, the first region 10A and the second region 10B are not opposed to each other via the base material 11.

(Production Method of Resin Molded Sheet 30)

Furthermore, the resin molded sheet 30 according to the present embodiment is produced as described below.

First, as in the first embodiment, as the base material 11, a sheet-like material, for example, non-stretched PET is prepared as the base material 11. The base material 11 may be in the form of a roll or may be cut in advance.

Next, a binder made of a thermoplastic resin or the like and a thermally expandable material are mixed to prepare an ink for forming the first thermal expansion layer 31. At this time, the heat conversion material is further mixed into the ink. Using this ink, the ink is placed on the first surface of the base material 11 in a pattern corresponding to the first thermal expansion layer 31 by any printing apparatus, for example, a screen printing apparatus. Subsequently, the solvent is evaporated to form the first thermal expansion layer 31. In addition, in order to form the first thermal expansion layer 31 of desired thickness, printing may be performed multiple times.

Subsequently, a binder made of a thermoplastic resin or the like, a thermally expandable material, and a heat conversion material are mixed to prepare an ink for forming the second thermal expansion layer 32. The ink is used to form the second thermal expansion layer 32 by any printing device, for example, a screen printing device. The second thermal expansion layer 32 may be formed using the same ink as the ink for forming the first thermal expansion layer 31. In addition, cutting is performed if necessary.

Thereby, the resin molded sheet 30 is produced.

(Shaped Article 43)

Next, a shaped article 43 will be described using the drawings. The shaped article 43 is manufactured by expanding the first thermal expansion layer 31 and the second thermal expansion layer 32 as in the first embodiment. In the shaped article 43, as illustrated in FIG. 12B, the first thermal expansion layer 31 has a convex portion 31a on the upper surface, and the second thermal expansion layer 32 is provided with a convex portion 32a protruding in the downward direction illustrated in FIG. 12B. The base material 11 has the convex portion 11a which is deformed to follow the expansion of the first thermal expansion layer 31 on the first surface. Similarly, the base material 11 has, on the second surface, the convex portion 11c deformed to follow the expansion of the second thermal expansion layer 32. Further, the base material 11 has a concave portion 11b having a shape corresponding to the first convex portion 11a and a concave portion 11d having a shape corresponding to the second convex portion 11c. Further, in the present embodiment, since the heat conversion material is included in the first thermal expansion layer 31 and the second thermal expansion layer 32, the shaped article 43 does not include a heat conversion layer.

Further, in the shaped article 43 of the present embodiment, as in the first embodiment, the deformation amount of the base material 11 may be larger than the foam height of the first thermal expansion layer 31. The same applies to the second thermal expansion layer 32. Further, as in the first embodiment, the application of the shaped article 43 is arbitral, and the shaped article 43 may be provided with a color ink layer (not illustrated).

(Production Method of Shaped Article 43)

In the present embodiment, since the first thermal expansion layer 31 and the second thermal expansion layer also function as a heat conversion layer, steps S1 and S2 in the flowchart (FIG. 5) of the first embodiment are omitted, and the shaped article 43 can be produced only by implementing step S3.

Specifically, the resin molded sheet 30 is conveyed to the expansion device 50 such that a front surface is directed upward. In the expansion device 50, the irradiation unit 51 applies electromagnetic waves to the conveyed resin molded sheet 30. As a result, the first thermal expansion layer 31 and the second thermal expansion layer 32 generate heat, and the base material 11 is softened. Furthermore, the heat generated in the first thermal expansion layer 31 causes a thermally expandable material to foam and expand. As a result, the region provided with the first thermal expansion layer 31 of the resin molded sheet 30 expands and swells. The base material 11 softened by the heat from the first thermal expansion layer 31 is deformed by being pulled by the expanding force of the first thermal expansion layer 31, as illustrated in FIG. 12B. Similar to the second thermal expansion layer 32, the heat generated in the second thermal expansion layer 32 softens the base material 11, and the thermally expandable material foams and expands. Thereby, the base material can be deformed so as to be pulled by the expanding force of the second thermal expansion layer 32.

As described above, in the present embodiment, as in the first embodiment, the resin molded sheet 30 can be easily molded into a desired shape. In the present embodiment, in particular, the heat conversion material is contained in the first thermal expansion layer 31 and the second thermal expansion layer 32, whereby the process of forming the heat conversion layer can be omitted, and the resin molded sheet 30 can be further easily molded into a desired shape.

Figure 13A:
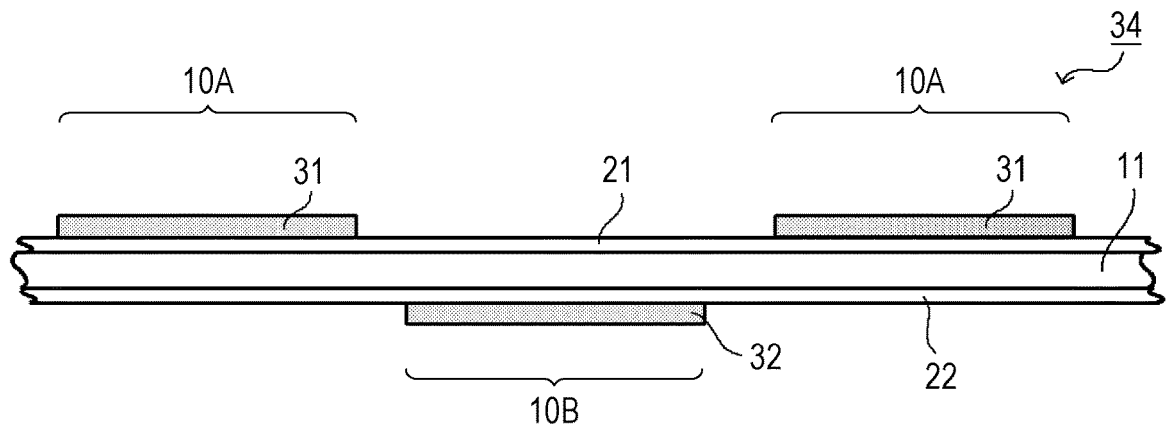
FIG. 13A is a view illustrating a resin molded sheet according to another embodiment.
Figure 13B:
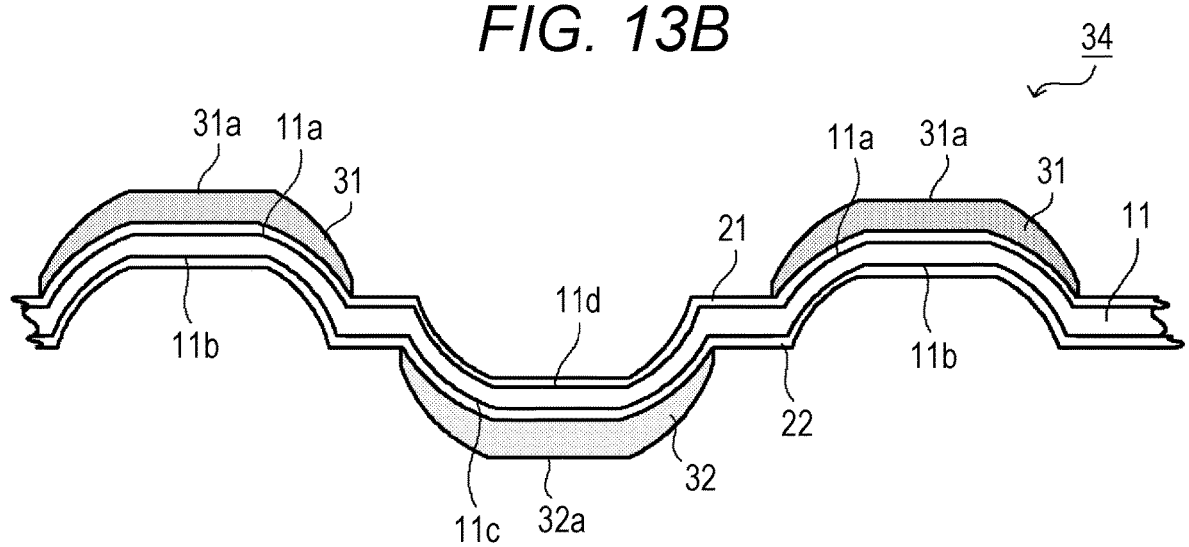
FIG. 13B is view illustrating a state in which a thermal expansion layer of the resin molded sheet illustrated in FIG. 13A is expanded.
Figure 13C:
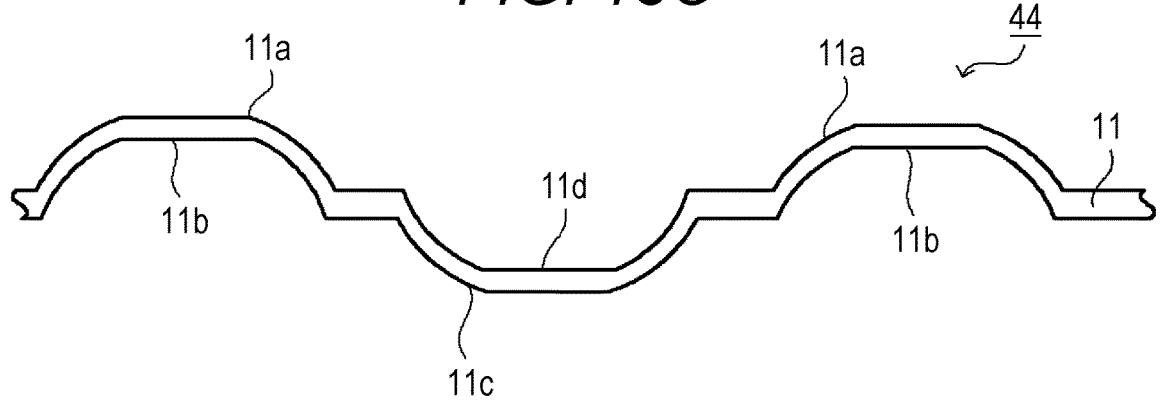
FIG. 13C is a cross-sectional view of a shaped article according to another embodiment.

Note that at least one of the first thermal expansion layer 31 and the second thermal expansion layer 32 may be peelable from the base material 11 by combining the features of the second embodiment with the present embodiment. For example, as illustrated in FIG. 13A, the resin molded sheet 34 includes the first intermediate layer 21 between the base material 11 and the first thermal expansion layer 31, and the second intermediate layer 22 between the base material 11 and the second thermal expansion layer 32. Next, in the resin molded sheet 34, the first thermal expansion layer 31 and the second thermal expansion layer 32 are expanded as in the third embodiment to form the base material 11. After molding, by peeling the first intermediate layer 21 and the second intermediate layer 22 from the base material 11, the first thermal expansion layer 31 and the second thermal expansion layer 32 can be removed from the base material 11 to obtain the shaped article 44.

The present embodiment is not limited to the above-described embodiment, and various modifications and applications are possible.

For example, in the first embodiment, the configuration in which the first thermal expansion layer 12 and the second thermal expansion layer 13 are simultaneously expanded has been described as an example, but the present invention is not limited thereto. It is also possible to expand one of the first thermal expansion layer 12 and the second thermal expansion layer 13 first and to expand the other one later. For example, it is possible that the first thermal expansion layer 12 is expanded using the expansion device 50 illustrated in FIG. 4, the convex portion 11a is formed on the first surface of the base material 11, and subsequently, the second thermal expansion layer 13 is expanded to form the convex portion 11c on the second surface of the base material 11. The same applies to the second embodiment and the third embodiment. In this case, in the second embodiment, the step of peeling off the intermediate layer (step S24) may be performed after the first thermal expansion layer 12 and the second thermal expansion layer 13 are expanded. Alternatively, step S24 may be performed after one of the thermal expansion layers is expanded and performed step S24 again after the other thermal expansion layer is expanded.

Further, in the first embodiment described above, it is exemplified that, in the expansion device 50, electromagnetic waves are irradiated from one side of the resin molded sheet 10, but the present embodiment is not limited thereto, and the expansion device 50 may further include another irradiation unit 51, and the electromagnetic wave may also be irradiated from the other surface of the resin molded sheet 10 (from the lower side illustrated in FIG. 4). In this configuration, the first and second surfaces of the resin molded sheet 10 can be irradiated with electromagnetic waves from the respective irradiation units, and can be irradiated with the electromagnetic waves simultaneously. Thereby, it is possible to expand the first thermal expansion layer 12 and the second thermal expansion layer 13 collectively. The same applies to the second embodiment and the third embodiment.

Although, in the first and second embodiments, the structure is exemplified which forms the first heat conversion layer 81 and the second heat conversion layer 82 in the production method of a shaped article, but the present embodiment is not limited thereto. For example, it is also possible to perform the process of forming the first heat conversion layer 81 and the second heat conversion layer 82 in the production method of a resin molded sheet. In this case, for example, the resin molded sheet 10 of the first embodiment further includes the first heat conversion layer 81 and the second heat conversion layer 82.

In the embodiments described above, the heat conversion layer is printed by the printing, and the thermal expansion layer is expanded by the expansion device 50 as an example, but the present embodiment is not limited to this. For example, it is also possible to use a shaped article manufacturing apparatus in which a printing device, an expansion device and the like are housed in a frame.

Further, each drawing used in each embodiment is for describing each embodiment. Therefore, the thickness of each layer of the resin molded sheet is not intended to be interpreted as being limited to being formed at a ratio as illustrated in the drawing. Further, in the drawings used in each embodiment, a heat conversion layer and the like provided on the front surface and/or the back surface of the resin molded sheet are also highlighted for the sake of explanation. For this reason, the thickness of the heat conversion layer or the like is not intended to be interpreted as being limited to being formed in the ratio as illustrated in the drawing.

Although several embodiments of the present invention have been described, the present invention is included in the invention described in the claims and the equivalent range thereto.

The invention claimed is:
1. A resin molded sheet comprising:
   a base material made of resin;
   a first thermal expansion layer including a thermally expandable material and provided on a first surface of the base material; and a second thermal expansion layer including a thermally expandable material and provided on a second surface of the base material, wherein the first thermal expansion layer is provided at least on a first region, where the base material is deformed by the first thermal expansion layer, on the first surface of the base material, and the second thermal expansion layer is provided at least in a second region, where the base material is deformed by the second thermal expansion layer, on the second surface of the base material.

2. The resin molded sheet according to claim 1,
wherein the first region and the second region are disposed so as not to face each other via the base material.

3. The resin molded sheet according to claim 1,
wherein at least one of the first thermal expansion layer and the second thermal expansion layer is at least partially provided peelably from the base material.

4. The resin molded sheet according to claim 1, further comprising
at least one of a first intermediate layer provided between the first thermal expansion layer and the base material, and a second intermediate layer provided between the second thermal expansion layer and the base material, wherein the peel strength between the first intermediate layer and the base material is lower than the peel strength between the first thermal expansion layer and the first intermediate layer, and the first intermediate layer and the first thermal expansion layer are removable from the base material, and the peel strength between the second intermediate layer and the base material is lower than the peel strength between the second thermal expansion layer and the second intermediate layer, and the second intermediate layer and the second thermal expansion layer are removable from the base material.

5. The resin molded sheet according to claim 1,
wherein at least one of the first thermal expansion layer and the second thermal expansion layer further includes an electromagnetic wave heat conversion material for converting electromagnetic waves into heat.

6. The resin molded sheet according to claim 1, further comprising:
a first heat conversion layer including an electromagnetic wave heat conversion material for converting electromagnetic waves into heat, and provided on the first thermal expansion layer in the first region; and
a second heat conversion layer including an electromagnetic wave heat conversion material for converting electromagnetic waves into heat, and provided on the second thermal expansion layer in the second region.

7. A production method of a resin molded sheet, comprising the steps of:
forming a first thermal expansion layer containing a thermally expandable material on a first surface of a base material made of resin; and
forming a second thermal expansion layer containing a thermally expandable material on a second surface of the base material;
wherein, in the forming a first thermal expansion layer, at least the first thermal expansion layer is formed in a first region, where the base material is deformed by the first thermal expansion layer, on the first surface of the base material, and
in the forming a second thermal expansion layer, at least the second thermal expansion layer is formed in a second region, where the base material is deformed by the second thermal expansion layer, on the second surface of the base material.

8. The production method of a resin molded sheet according to claim 7,
wherein the first region and the second region are disposed so as not to face each other via the base material.

9. The production method of a resin molded sheet according to claim 7,
wherein at least one of the first thermal expansion layer and the second thermal expansion layer is at least partially provided peelably from the base material.

10. The production method of a resin molded sheet according to claim 7, comprising, prior to the forming a first thermal expansion layer and the forming a second thermal expansion layer, the steps of:
forming a first intermediate layer provided between the first thermal expansion layer and the base material; and
forming a second intermediate layer provided between the second thermal expansion layer and the base material.

11. The production method of a resin molded sheet according to claim 10,
wherein the peel strength between the first intermediate layer and the base material is lower than the peel strength between the first thermal expansion layer and the first intermediate layer, and the first intermediate layer and the first thermal expansion layer are removable from the base material, and
the peel strength between the second intermediate layer and the base material is lower than the peel strength between the second thermal expansion layer and the second intermediate layer, and the second intermediate layer and the second thermal expansion layer are removable from the base material.

12. A shaped article, comprising:
a base material made of resin;
a first thermal expansion layer containing a thermally expandable material, and provided on a first surface of the base material;
a second thermal expansion layer containing a thermally expandable material, and provided on a second surface of the base material;
a first heat conversion layer provided on the first thermal expansion layer, that is, in a first region where the base material is deformed using the first thermal expansion layer, and the first heat conversion layer containing an electromagnetic wave heat conversion material that converts electromagnetic waves into heat; and
a second heat conversion layer provided on the second thermal expansion layer, that is, in a second region where the base material is deformed using the second thermal expansion layer, and the second heat conversion layer containing an electromagnetic wave heat conversion material that converts electromagnetic waves into heat,
wherein, in the first region, the first thermal expansion layer is raised due to expansion, and the base material is deformed following the first thermal expansion layer, and
in the second region, the second thermal expansion layer is raised due to expansion, and the base material is deformed following the second thermal expansion layer.

13. The resin molded sheet according to claim 12,
wherein the first region and the second region are disposed so as not to face each other via the base material.

14. A production method of a shaped article, using a resin molded sheet provided with a base material made of resin, a first thermal expansion layer containing a thermally expandable material and provided on a first surface of the base material, and the second thermal expansion layer containing a thermally expandable material and provided on a second surface of the base material, the production method comprising the steps of:
- forming a first heat conversion layer for converting electromagnetic waves into heat on the first thermal expansion layer, that is, on a first region where the base material is deformed using the first thermal expansion layer;
- forming a second heat conversion layer for converting electromagnetic waves into heat on the second thermal expansion layer, that is, on a second region where the base material is deformed using the second thermal expansion layer,
- irradiating the first heat conversion layer with electromagnetic waves to expand the first thermal expansion layer and deform the base material in the first region; and
- irradiating the second heat conversion layer with electromagnetic waves to expand the second thermal expansion layer and deform the base material in the second region.

15. The production method of a shaped article according to claim 14, wherein the irradiating a first heat conversion layer with electromagnetic waves and the irradiating a second heat conversion layer with electromagnetic waves are performed simultaneously.

16. The production method of a shaped article according to claim 15, wherein the base material is transparent.

17. The production method of a shaped article according to claim 14,
wherein at least one of the first thermal expansion layer and the second thermal expansion layer is peelably adhered to the base material, and
the production method further includes the step of removing at least one of the first thermal expansion layer and the second thermal expansion layer after molding the base material.

18. The production method of a shaped article according to claim 14, wherein, in the forming a second heat conversion layer, the second heat conversion layer is formed so as not to face the first heat conversion layer formed in the forming a first heat conversion layer via the base material.

* * * * *